(12) United States Patent
Wang et al.

(10) Patent No.: US 8,767,737 B2
(45) Date of Patent: Jul. 1, 2014

(54) DATA CENTER NETWORK SYSTEM AND PACKET FORWARDING METHOD THEREOF

(75) Inventors: Yu-Cheng Wang, Miaoli County (TW); Cheng-Chun Tu, Stony Brook, NY (US); Tzi-Cker Chiueh, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 147 days.

(21) Appl. No.: 13/307,003

(22) Filed: Nov. 30, 2011

(65) Prior Publication Data

US 2013/0136126 A1    May 30, 2013

(51) Int. Cl.
| | | |
|---|---|---|
| *H04L 12/28* | (2006.01) | |
| *H04L 5/14* | (2006.01) | |
| *H04L 12/66* | (2006.01) | |
| *G06F 15/173* | (2006.01) | |
| *G06F 15/16* | (2006.01) | |

(52) U.S. Cl.
USPC ........... 370/392; 370/275; 370/352; 370/399; 370/401; 370/409; 709/226; 709/235; 709/239

(58) Field of Classification Search
USPC ................. 370/352, 392, 399, 401, 409, 275; 709/105, 226, 235, 239
See application file for complete search history.

(56) References Cited

U.S. PATENT DOCUMENTS

| | | | |
|---|---|---|---|
| 7,480,710 | B1 | 1/2009 | Olson et al. |
| 7,480,737 | B2 | 1/2009 | Chauffour et al. |
| 7,814,232 | B2 | 10/2010 | Satapati et al. |
| 2002/0069335 | A1 | 6/2002 | Flylnn, Jr. |
| 2003/0108052 | A1* | 6/2003 | Inoue et al. .................... 370/399 |
| 2007/0050520 | A1* | 3/2007 | Riley ............................. 709/239 |
| 2007/0116011 | A1 | 5/2007 | Lim et al. |
| 2009/0049199 | A1 | 2/2009 | Kuik et al. |
| 2009/0303880 | A1* | 12/2009 | Maltz et al. ................... 370/235 |
| 2010/0138830 | A1* | 6/2010 | Astete et al. ...................... 718/1 |

(Continued)

FOREIGN PATENT DOCUMENTS

| | | | |
|---|---|---|---|
| CN | 1495631 | 5/2004 | |
| CN | WO2012051884 A1 * | 4/2012 | ............. H04L 29/06 |
| EP | 1551133 | 7/2005 | |
| TW | 201118738 | 6/2011 | |

OTHER PUBLICATIONS

Paul F. Tsuchiya et al., "Extending the IP Internet Through Address Reuse", ACM SIGCOMM, 1993, p. 16-p. 33.

(Continued)

*Primary Examiner* — Jung Park
*Assistant Examiner* — Chuong M Nguyen
(74) *Attorney, Agent, or Firm* — Jianq Chyun IP Office

(57) ABSTRACT

A data center network system and a packet forwarding method thereof are provided. The data center network system includes a virtual bridge and an address resolution protocol (ARP) server. The virtual bridge intercepts an ARP request having an identification field and a destination IP address field and adds a corresponding virtual data center identification to the identification field of the ARP request and redirecting the ARP request to the ARP server. Additionally, the ARP server queries a corresponding MAC address according to an IP address recorded in the destination IP address field of the ARP request and the corresponding VDCID recorded in the identification field of the ARP request, and transmits the corresponding MAC address in response to the ARP request. Accordingly, the same private IP address can be reused in the data center network system.

22 Claims, 19 Drawing Sheets

(56) References Cited

U.S. PATENT DOCUMENTS

2010/0272107 A1 10/2010 Papp et al.
2011/0292939 A1* 12/2011 Subramaian et al. ......... 370/392
2011/0317703 A1* 12/2011 Dunbar et al. ................ 370/392
2012/0303835 A1* 11/2012 Kempf et al. ................. 709/235
2013/0107889 A1* 5/2013 Barabash et al. ............. 370/409

OTHER PUBLICATIONS

"Office Action of Taiwan counterpart application" issued on Dec. 18, 2013, p. 1-p. 13, in which the listed references were cited.

* cited by examiner

| | Internet protocol (IP) address | Virtual data center identification (VDCID) | Media access control (MAC) address |
|---|---|---|---|
| 118a First entry | IP1 | VDCID1 | MAC1 |
| 118b Second entry | IP2 | VDCID2 | MAC2 |
| ⋮ | ⋮ | ⋮ | ⋮ |

118

| | IP address | VDCID | MAC address |
|---|---|---|---|
| First mapping | IP6 | VDCID6 | MAC6 |
| Second mapping | IP7 | VDCID7 | MAC7 |
| Third mapping | IP8 | VDCID8 | MAC8 |
| ⋮ | ⋮ | ⋮ | ⋮ |

| 932a | Source IP address | Source port | Destination IP address | Destination port | MAC address |
|---|---|---|---|---|---|
| First connection | SRC_IP1 | SRC_PORT1 | DST_IP1 | DST_PORT2 | MAC11 |
| ⋮ | ⋮ | ⋮ | ⋮ | ⋮ | ⋮ |

| | Destination IP address | VDCID |
|---|---|---|
| First mapping | IP12 | VDCID12 |
| ⋮ | ⋮ | ⋮ |

1322a

1322

DATA CENTER NETWORK SYSTEM AND PACKET FORWARDING METHOD THEREOF

BACKGROUND OF THE DISCLOSURE

1. Field of the Disclosure

The disclosure relates to a data center network system and a packet forwarding method thereof.

2. Description of Related Art

Along with development of network technology, corporations widely use networks to provide services or exchange information. However, cost for constructing and maintaining network equipments is considerable. Therefore, an operation mode of a network data center is gradually developed. The so-called network data center is referred to a large-scale data storage center, which can provide services such as host collocation, host rent, remote backup, and system and network management, etc. for the corporations. For example, after a corporation rent a host space or purchase a host collocation service from a network data center provider, the corporation can arbitrarily access and manage all information stored in the host space. Therefore, it is unnecessary for the corporation to construct a machine room for containing hardware or telecommunication equipments, instead, the corporation can place the related machines in the machine room owned by the network data center provider or rent the machines owned by the network data center provider. In this way, a cost for network connection is reduced, and a labour cost for daily maintenance of the equipments is saved.

An Ethernet is a trend of the current network structure, which has been widely applied in local area networks, and the Ethernet is also adapted the data center network. However, in the network data center, a plurality of virtual machines belonged to different corporations are required to be managed, so that it is an important issue to ensure various corporations correctly and effectively access the information stored in the space of the corresponding virtual machine.

In detail, when a transmitter on the Ethernet wants to send a data packet to a receiver for communication, an exclusive Internet protocol (IP) address has to exist between the transmitter and the receiver, so as to correctly forward the data packet according to the IP address. Therefore, the network data center generally reassigns exclusive IP addresses to the virtual machines belonged to different corporations, where different virtual machines require different IP addresses, so as to correctly forward the data packets.

SUMMARY OF THE DISCLOSURE

The disclosure is directed to a data center network system and a packet forwarding method thereof, where a same private Internet protocol (IP) address can be reused in a same data center network system.

The disclosure further provides a data center network system including a virtual bridge connected to a network, an ARP server connected to the network, and a virtual machine executed on a physical machine and connected to the network through the virtual bridge. The virtual bridge intercepts an ARP request from the virtual machine for querying a MAC address of a target virtual machine, adds a corresponding VDCID to an identification field of the ARP request and redirects the ARP request. Moreover, the ARP server queries a corresponding MAC address according to an IP address recorded in a destination IP address field of the ARP request and the corresponding VDCID recorded in the identification field of the ARP request, and transmits the corresponding MAC address in response to the ARP request.

The disclosure provides a data center network system including a first physical machine connected to a network, a virtual bridge executed on the first physical machine and connected to the network, and an address resolution protocol (ARP) server connected to the network. The virtual bridge intercepts an address resolution protocol (ARP) request having an identification field and a destination IP address field, adds a corresponding virtual data center identification (VDCID) to the identification field of the ARP request and redirects the ARP request to the ARP server. Moreover, the ARP server queries a corresponding MAC address according to an IP address recorded in the destination IP address field of the ARP request and the corresponding VDCID recorded in the identification field of the ARP request, and transmits the corresponding MAC address in response to the ARP request.

The disclosure provides a virtual bridge executed on a first physical machine and connected to a network. Where, a first virtual machine and a second virtual machine in the virtual machines are executed on the first physical machine. The virtual bridge includes a receiving module, an identification module, and a transmitting module. The receiving module intercepts a first address resolution protocol (ARP) request, where a first virtual machine broadcasts the first ARP request for querying a MAC address of a second virtual machine. The identification module coupled to the receiving module, and configured for determining whether a virtual data center identification (VDCID) of the first virtual machine is the same as a VDCID of the second virtual machine. The transmitting module coupled to the identification module. When the identification module determines the VDCID of the first virtual machine is the same as the VDCID of the second virtual machine, the transmitting module forwards a MAC address of the second virtual machine to the first virtual machine in response to the first ARP request.

The disclosure provides an address resolution protocol (ARP) server including a receiving module, an address query table maintaining module coupled to the receiving module, and a transmitting module coupled to the address query table maintaining module and the receiving module. Where, the receiving module receives an ARP request having a destination IP address field and an identification field. The address query table maintaining module maintains an address query table and queries a corresponding MAC address in the address query table according to an IP address recorded in the destination IP address field of the ARP request and a VDCID recorded in the identification field of the ARP request. The transmitting module transmits the corresponding MAC address in response to the ARP request.

The disclosure provides a packet forwarding method of a data center network system, where the data center network system includes a first physical machine and a plurality of virtual machines and a virtual bridge executed on the first physical machine. Where, a first virtual machine and a second virtual machine in the virtual machines are executed on the first physical machine and are connected to a network through the virtual bridge. Each of the virtual machines has a private Internet protocol (IP) address, a virtual data center identification (VDCID) and a media access control (MAC) address, and the virtual machines are respectively belonged to a plurality of virtual data centers (VDCs), and the virtual machines belonged to the same virtual data center (VDC) have the same VDCID. The virtual bridge has a virtual machine entry table corresponding to the first physical machine, where the virtual machine entry table stores a plurality of entries. The packet forwarding method includes following steps. The private IP address, the VDCID and the MAC address of the first virtual machine are recorded to a first entry in the entries, and the private IP address, the VDCID and the MAC address of the second virtual machine are recorded to a second entry in the entries. The first virtual machine is used to broadcast a first address resolution protocol (ARP) request for querying the MAC address of the second virtual machine, where a destination IP address field of the first ARP request records the private IP address of the second virtual machine. Then, the virtual bridge is used to intercept the first ARP request and determine whether the VDCID of the first virtual machine is the same as the VDCID of the second virtual machine according to the virtual machine entry table corresponding to the first physical machine. When the VDCID of the first virtual machine is the same as the VDCID of the second virtual machine, the virtual bridge is used to forward the MAC address of the second virtual machine to the first virtual machine according to the virtual machine entry table corresponding to the first physical machine, so as to respond the first ARP request.

According to the above descriptions, the same private IP address can be reused in the same data center network system, so as to effectively resolve the problem of reassigning the private IP addresses in the same data center network system.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1A:
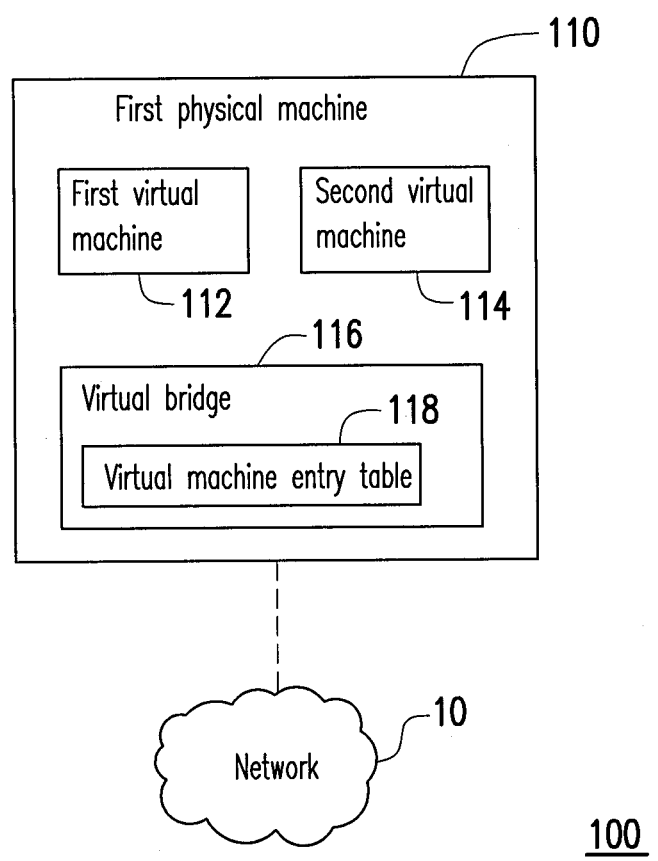
FIG. 1A is a schematic diagram of a data center network system according to a first exemplary embodiment of the disclosure.

In order to reuse the same private Internet protocol (IP) address range in a same data center network system, in the disclosure, a concept of virtual data center identification (VDCID) is used to identify hosts belonged to different corporations, so that after a different corporation moves part of its information technology (IT) infrastructure in the data center network system, it is unnecessary to reconstruct the network configuration.

In detail, first, the data center network system of the disclosure divides all of IP addresses thereof into three types.

The first type is a public IP address, which is provided to an external link for utilization, and the external link is linked to the data center network system through the public IP address for data accessing. The second type is a service IP address, which is provided to a server of a specific service or other service nodes in the data center network system for utilization. The third type is a private IP address, which is provided to virtual data centers (VDCs) for utilization. For example, a collection of machines belonged to a same corporation in the data center network system is regarded as a VDC.

Since different VDCs can use the same private IP address range, in the data center network system of the disclosure, the data packets are forwarded in a data link layer. In detail, different devices or service nodes in the data center network system are respectively identified according to a media access control (MAC) address of a lower part of the data line layer, and since each device or service node is allocated with a unique MAC address, confliction of the devices is avoided. However, how to identify the unique MAC address is a problem to be resolved by the disclosure.

The data center network system includes a physical machine, virtual machines executed on the physical machine and service nodes, etc., and since different virtual machines are probably belonged to different VDCs, the virtual machines in the same physical machine probably have the same private IP address. Therefore, in the disclosure, each VDC is assigned with a unique VDCID, and the virtual machines belonged to the same VDC have the same VDCID. In the disclosure, the correct MAC address can be obtained by simultaneously identifying a destination IP address and the VDCID, so as to correctly forward packets. To be specific, the data center network system according to the disclosure includes a virtual bridge and an address resolution protocol (ARP) server. The virtual bridge intercepts an address resolution protocol (ARP) request having an identification field and a destination IP address field and adds a corresponding virtual data center identification to the identification field of the ARP request and redirecting the ARP request to the ARP server. Additionally, the ARP server queries a corresponding MAC address according to an IP address recorded in the destination IP address field of the ARP request and the corresponding VDCID recorded in the identification field of the ARP request, and transmits the corresponding MAC address in response to the ARP request. In this way, only the virtual machines belonged to the same VDC can transmit data, so that data confidentiality of the data center network system is maintained. Several exemplary embodiments are provided below to describe the disclosure in detail.

First Exemplary Embodiment

FIG. 1A is a schematic diagram of a data center network system according to the first exemplary embodiment of the disclosure.

Referring to FIG. 1A, the data center network system 100 includes a first physical machine 110, a first virtual machine 112, a second virtual machine 114 and a virtual bridge 116.

The first physical machine 110 is coupled to a network 10, and the network 10 is, for example, an Ethernet, though the disclosure is not limited thereto. The first physical machine 110 is a physical host (for example, a server). Particularly, the first physical machine 110 can execute one or a plurality of virtual machines to provide different services. For example, in the present exemplary embodiment, the first virtual machine 112 and the second virtual machine 114 are executed on the first physical machine 110.

Figures 1B, 1C:
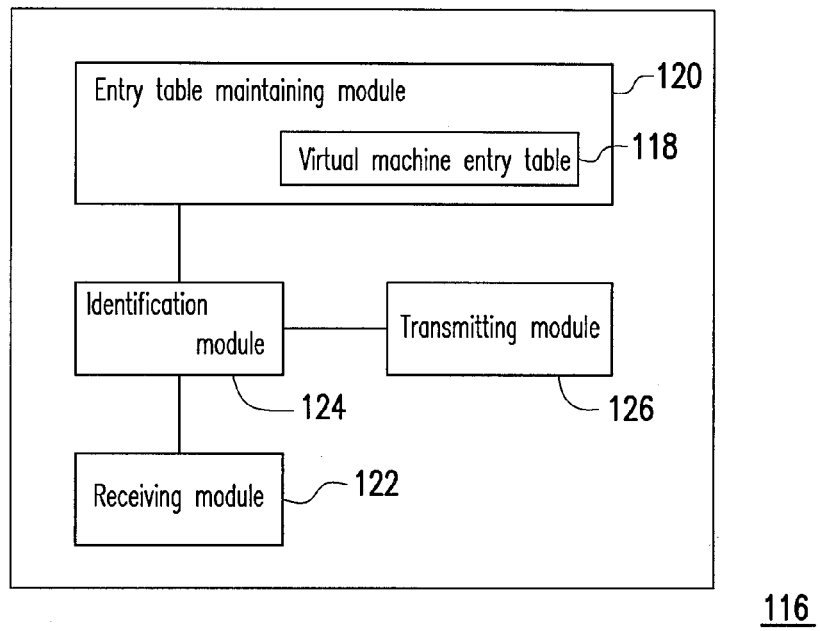
FIG. 1B is an implementation of a virtual bridge according to the first exemplary embodiment of the disclosure.
FIG. 1C is an implementation of a virtual machine entry table 118 according to the first exemplary embodiment of the disclosure.

FIG. 1B is an implementation of a virtual bridge 116 according to the first exemplary embodiment of the disclosure. Please refer to FIG. 1B, the virtual bridge 116 includes an entry table maintaining module 120, a receiving module 122, an identification module 124, and a transmitting module 126.

In detail, the entry table maintaining module 120 maintains a virtual entry table 118 of the first physical machine 110. The receiving module 122 is responsible for intercepting an address resolution protocol (ARP) request. The identification module 124, coupled to the entry table maintaining module 120 and the receiving module 122, performs the virtual data center identification (VDCID) comparison according to the virtual entry table 118.

The virtual bridge 116 is executed on the first physical machine 110, and the first virtual machine 112 and the second virtual machine 114 are coupled to the network 10 through the virtual bridge 116. The virtual bridge 116 has a virtual machine entry table 118 corresponding to the first physical machine 110. The virtual machine entry table 118 stores a plurality of entries (shown in FIG. 1C), and the entries record private IP addresses, VDCIDs and MAC addresses of all virtual machines executed on the first physical machine 110. In detail, when the first virtual machine 112 and the second virtual machine 114 are initially operated, the first virtual machine 112 and the second virtual machine 114 have to register in the virtual bridge 116 to record the private IP addresses, the VDCIDs and the MAC addresses thereof. For example, a first entry 118a of the virtual machine entry table 118 records the private IP address IP1, the VDCID VDCID1 and the MAC address MAC1 of the first virtual machine 112, and a second entry 118b of the virtual machine entry table 118 records the private IP address IP2, the VDCID VDCID2 and the MAC address MAC2 of the second virtual machine 114.

In the present exemplary embodiment, when the first virtual machine 112 wants to communicate with the second virtual machine (i.e., target virtual machine) 114, the first virtual machine 112 broadcasts an address resolution protocol (ARP) request (which is referred to as a first ARP request hereinafter) for querying the MAC address MAC2 of the second virtual machine 114, and transmits data packets according to the obtained MAC address. A data packet forwarding method of the first exemplary embodiment is described in detail below with reference of a flowchart.

Figure 2:
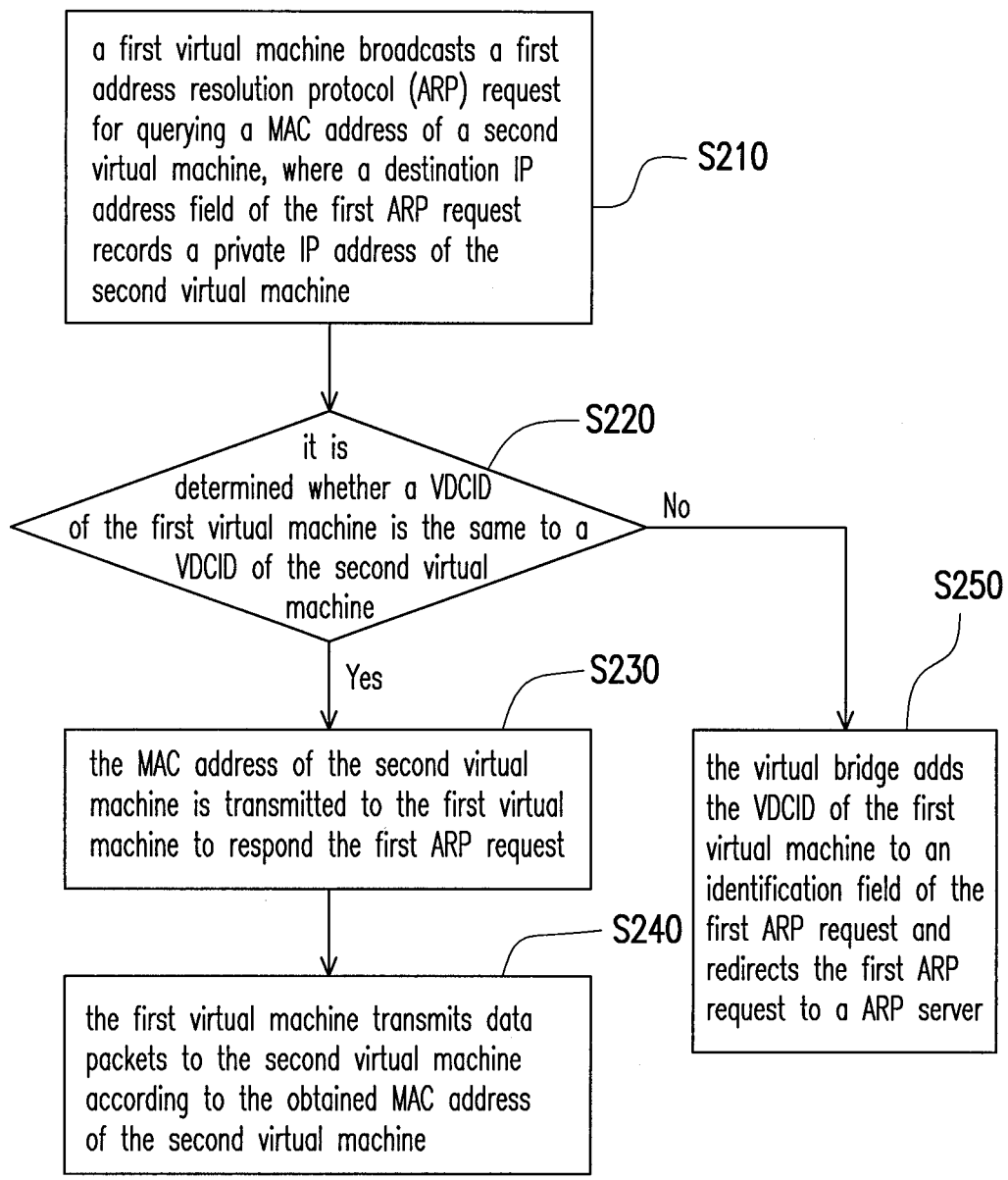
FIG. 2 is a flowchart illustrating a packet forwarding method according to the first exemplary embodiment of the disclosure.

FIG. 2 is a flowchart illustrating a packet forwarding method according to the first exemplary embodiment of the disclosure.

Referring to FIG. 2, in step S210, the first virtual machine 112 broadcasts a first ARP request for querying the MAC address MAC2 of the second virtual machine 114, where a destination IP address field of the first ARP request records the private IP address IP2 of the second virtual machine 114.

Then, in step S220, the virtual bridge 116 intercepts the first ARP request, and determines whether the VDCID VDCID1 of the first virtual machine 112 is the same as the VDCID VDCID2 of the second virtual machine 114 according to the virtual machine entry table 118 corresponding to the first physical machine 110. In detail, the virtual bridge 116 queries the virtual machine entry table 118 according to the private IP address of the second virtual machine 114 recorded in the destination IP address field of the first ARP request. The virtual bridge 116 compares to determine whether the VDCID VDCID1 of the first virtual machine 112 and the VDCID VDCID2 of the second virtual machine 114 in the virtual machine entry table 118 are the same.

If the VDCID VDCID1 of the first virtual machine 112 is the same as the VDCID VDCID2 of the second virtual machine 114, in step S230, the virtual bridge 116 forwards the MAC address MAC2 of the second virtual machine 114 to the first virtual machine 112 according to the virtual machine entry table 118 corresponding to the first physical machine 110, so as to respond the first ARP request. Then, in step S240, the first virtual machine 112 forwards data packets to the second virtual machine 114 according to the obtained MAC address MAC2 of the second virtual machine 114.

Comparatively, if the VDCID VDCID1 of the first virtual machine 112 is different with the VDCID VDCID2 of the second virtual machine 114, in step S250, the virtual bridge 116 adds the VDCID VDCID1 of the first virtual machine 112 to an identification field of the first ARP request and redirects the first ARP request to an ARP server.

Second Exemplary Embodiment

Figure 3A:
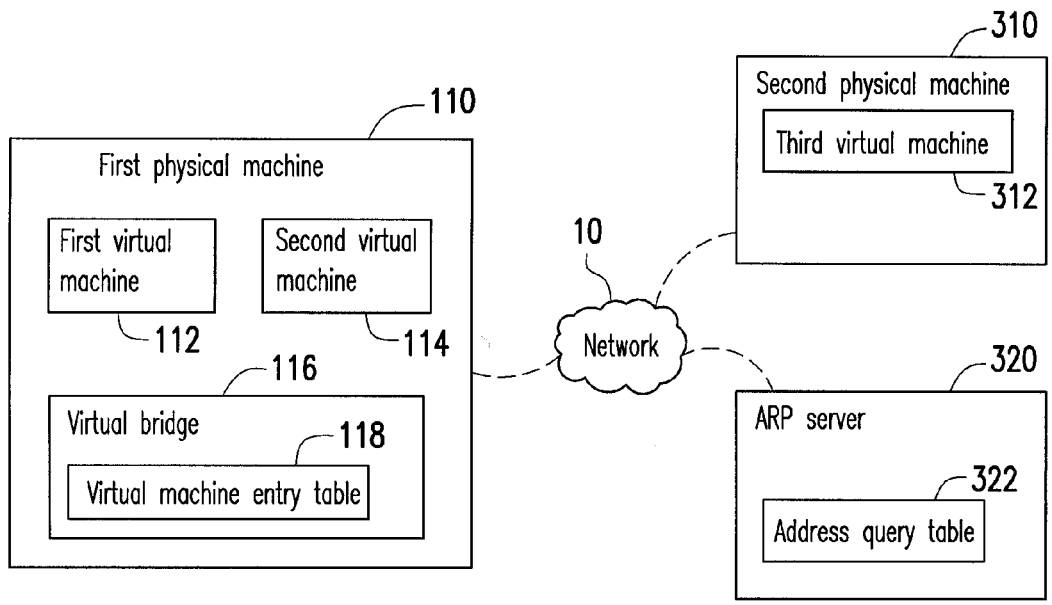
FIG. 3A is a schematic diagram of a data center network system according to a second exemplary embodiment of the disclosure.

FIG. 3A is a schematic diagram of a data center network system according to the second exemplary embodiment of the disclosure.

Referring to FIG. 3A, besides the first physical machine 110, the first virtual machine 112, the second virtual machine 114, the virtual bridge 116 and the virtual machine entry table 118, the data center network system 300 further includes a second physical machine 310, a third virtual machine 312 executed on the second physical machine 310 and an ARP server 320.

The second physical machine 310 is coupled to the network 10. Similar to the first physical machine 110, the second physical machine 310 is a physical host (for example, a server), which can execute one or a plurality of virtual machines to provide different services. In the present exemplary embodiment, the third virtual machine 312 is executed on the second physical machine 310.

Figure 3B:
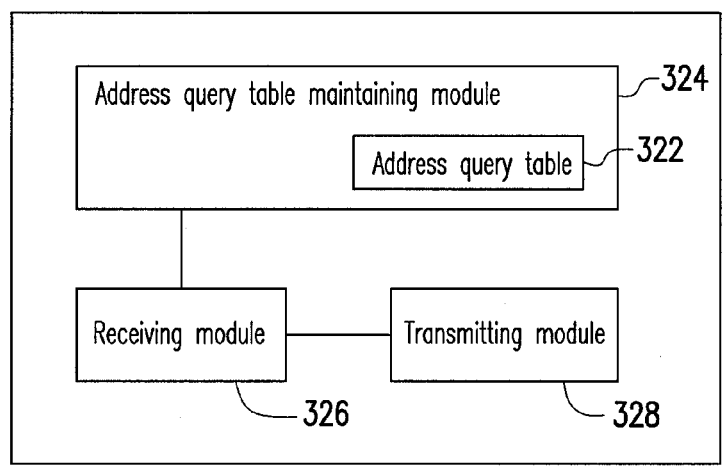
FIG. 3B is an implementation of an ARP server according to the second exemplary embodiment of the disclosure.

FIG. 3B is an implementation of an ARP server 320 according to the second exemplary embodiment of the disclosure. Please refer to the FIG. 3B, the ARP server 320 includes an address query table maintaining module 324, a receiving module 326, and a transmitting module 328. In detail, the address query table maintaining module 324 is for maintaining an address query table 322. The receiving module 326 is for receiving an ARP request from the virtual bridge 116. The transmitting module 328, coupled to the receiving module 326, transmits a packet having a MAC address, in response to respond the ARP request.

The ARP server 320 is coupled to the network 10 and is used for maintaining an address query table 322. The address query table 322 (shown in FIG. 3C) stores a plurality of mappings, and the mappings of the address query table 322 record the private IP address, the VDCID and the MAC address of each of the virtual machines in the data center network system 300.

In detail, when the first virtual machine 112, the second virtual machine 114 and the third virtual machine 312 are initially operated in the data center network system 300, the first virtual machine 112, the second virtual machine 114 and the third virtual machine 312 have to register in the virtual bridge 116 to record the private IP addresses, the VDCIDs and the MAC addresses thereof. For example, a first mapping 322a of the address query table 322 records the private IP address IP3, the VDCID VDCID3 and the MAC address MAC3 of the first virtual machine 112, a second mapping 322b of the address query table 322 records the private IP address IP4, the VDCID VDCID4 and the MAC address MAC4 of the second virtual machine 114, and a third mapping 322c of the address query table 322 records the private IP address IP5, the VDCID VDCID5 and the MAC address MAC5 of the third virtual machine 312.

In the present exemplary embodiment, since the first virtual machine 112 and the third virtual machine 312 are executed in different physical machines, when the first virtual machine 112 wants to communicate with the third virtual machine (i.e., target virtual machine) 312 and broadcasts an ARP request (which is referred to as a second ARP request hereinafter) for querying the MAC address MAC5 of the third virtual machine 312, the virtual bridge 116 adds the VDCID VDCID3 of the first virtual machine 112 to the second ARP request and redirects the second ARP request to the ARP server 320. Particularly, if the first virtual machine 112 and the third virtual machine 312 are belonged to the same VDC, the ARP server 320 transmits the MAC address MAC5 of the third virtual machine 312 to the virtual bridge 116 for providing to the first virtual machine 112. The packet forwarding method of the present exemplary embodiment is described below with reference of a flowchart in collaboration with a schematic diagram of data flows of a communication example executed between the first virtual machine 112 and the third virtual machine 312.

Figures 3C, 3D:
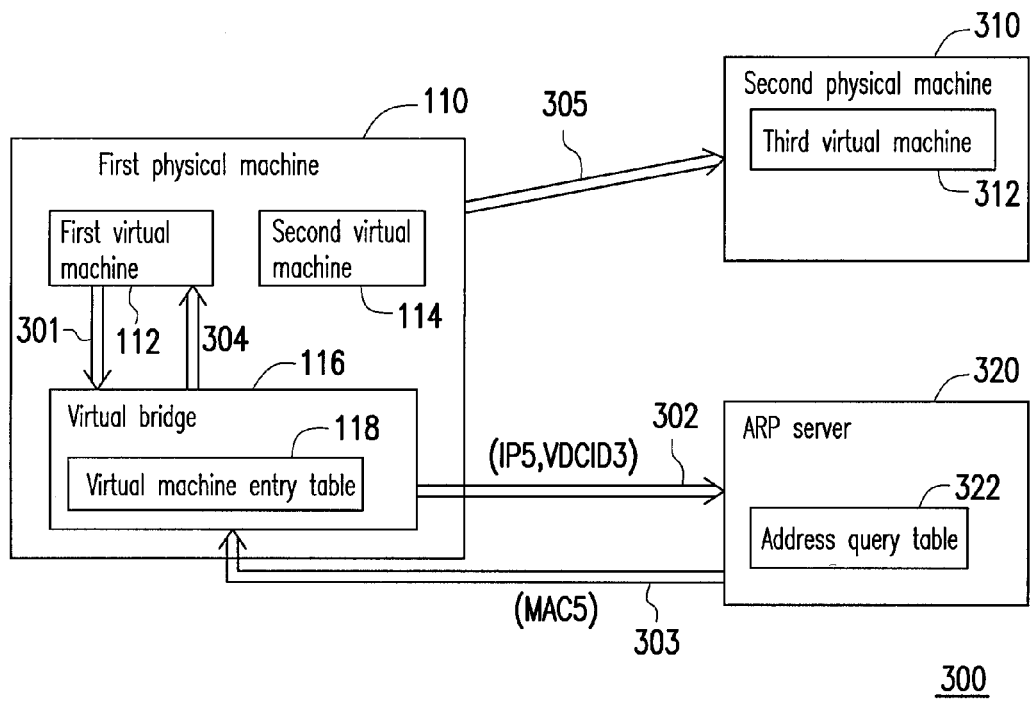
FIG. 3C is an implementation of an address query table 322 according to the second exemplary embodiment of the disclosure.
FIG. 3D is a schematic diagram illustrating data flows in communication between a virtual machine and a virtual machine according to the second exemplary embodiment of the disclosure.
Figure 4:
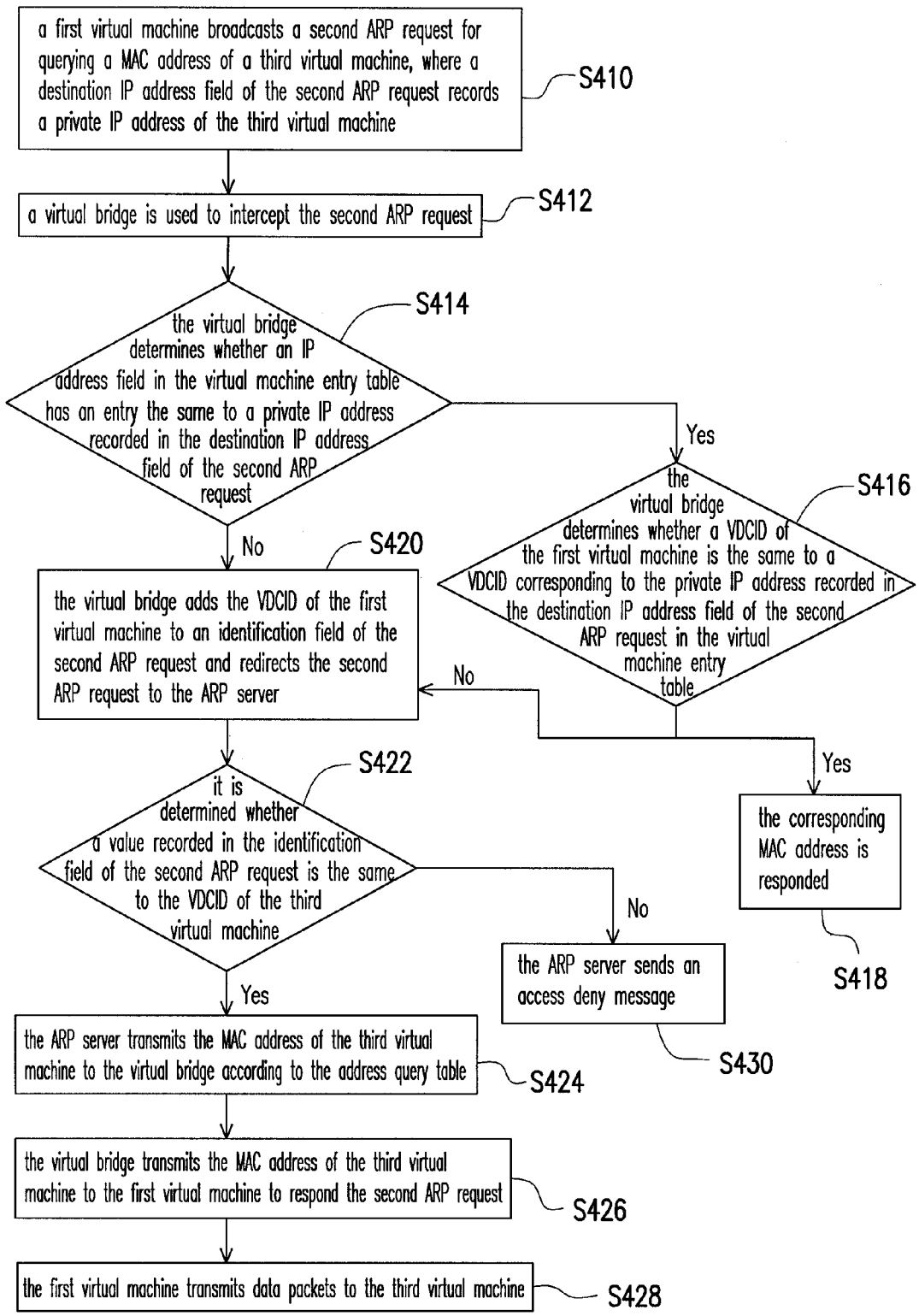
FIG. 4 is a flowchart illustrating the packet forwarding method according to the second exemplary embodiment of the disclosure.

FIG. 3D is a schematic diagram illustrating data flows in communication between the first virtual machine 112 and the third virtual machine 312 according to the second exemplary embodiment of the disclosure, and FIG. 4 is a flowchart illustrating the packet forwarding method according to the second exemplary embodiment of the disclosure.

Referring to FIG. 3D and FIG. 4, in step S410, the first virtual machine 112 broadcasts the second ARP request (shown as a data flow 301) for querying the MAC address MAC5 of the third virtual machine 312, where a destination IP address field of the second ARP request records the private IP address IP5 of the third virtual machine 312.

Similarly, in step S412, the virtual bridge 116 intercepts the second ARP request (shown as the data flow 301), and in step S414, the virtual bridge 116 determines whether an IP address field in the virtual machine entry table 118 has an entry the same as the private IP address recorded in the destination IP address field of the second ARP request. If yes, a step S416 is executed, by which the virtual bridge 116 continually determines whether the VDCID VDCID3 of the first virtual machine 112 is the same as the VDCID in the virtual machine entry table 118 corresponding to the private IP address recorded in the destination IP address field of the second ARP request. If the VDCIDs are indeed the same, the corresponding MAC address is responded (step S418), and if the VDCIDs are different, a step S420 is executed, by which the virtual bridge 116 adds the VDCID VDCID3 of the first virtual machine 112 to an identification field of the second ARP request and redirects the second ARP request to the ARP server 320.

Back to the step S414, if the virtual bridge 116 determines that the IP address field in the virtual machine entry table 118 does not have an entry the same as the private IP address recorded in the destination IP address field of the second ARP request, a step S422 is executed as well.

Then, in step S422, the ARP server 320 queries the VDCID VDCID5 of the third virtual machine 312 in the address query table 322 according to the private IP address IP5 of the third virtual machine 312, and determines whether a value recorded in the identification field of the second ARP request is the same as the VDCID VDCID5 of the third virtual machine 312.

If the value (i.e. the VDCID VDCID3) recorded in the identification field of the second ARP request is the same as the VDCID VDCID5 of the third virtual machine 312, in step S424, the ARP server 320 queries the MAC address MAC5 of the third virtual machine 312 according to the address query table 322, and transmits the MAC address MAC5 to the virtual bridge 116 (shown as a data flow 303). Moreover, in step S426, the virtual bridge 116 transmits the MAC address MAC5 of the third virtual machine 312 to the first virtual machine 112 to respond the second ARP request (shown as a data flow 304). Finally, in step S428, after the first virtual machine 112 obtains the MAC address MAC5 of the third virtual machine 312, it can transmit data packets to the third virtual machine 312 (shown as a data flow 305).

If the value recorded in the identification field of the second ARP request is different to the VDCID VDCID5 of the third virtual machine 312, a step S430 is executed, by which the ARP server 320 sends an access deny message.

Third Exemplary Embodiment

Figures 5A, 5B:
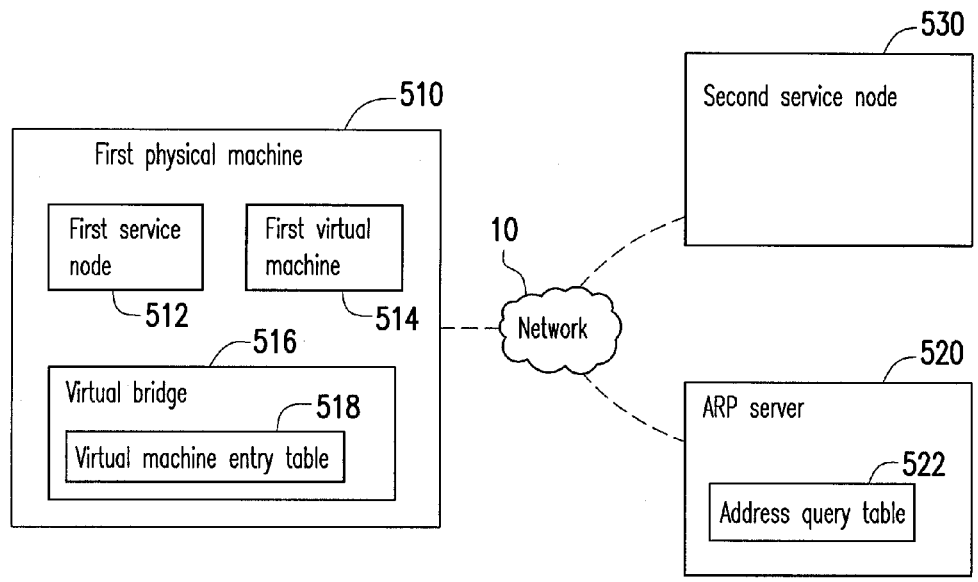
FIG. 5A is a schematic diagram of a data center network system according to a third exemplary embodiment of the disclosure.
FIG. 5B is an implementation of an address query table 522 according to the third exemplary embodiment of the disclosure.

FIG. 5A is a schematic diagram of a data center network system according to the third exemplary embodiment of the disclosure.

Referring to FIG. 5A, the data center network system 500 includes a first physical machine 510, a first service node 512 and a first virtual machine 514 executed on the first physical machine 510, a virtual bridge 516 and a virtual machine entry table 518. The data center network system 500 further includes an ARP server 520 and a second service node 530. The first physical machine 510, the ARP server 520 and the second service node 530 are all connected to the network 10.

The first physical machine 510 is similar to the first physical machine 110, which can execute one or a plurality of virtual machines and service nodes to provide different services.

Each of the service nodes has a service IP address, a VDCID and a MAC address. The VDCID of each of the service nodes is set to a same predetermined value, and the predetermined value can be set by those skilled in the art according to an actual requirement, which is not limited by the disclosure. In the exemplary embodiment, the second service node 530 is a physical host (for example, a server), which is used for providing a specific service to various devices in the data center network system 500.

A function of the virtual bridge 516 is similar to that of the virtual bridge 116, and the virtual bridge 516 is executed on the first physical machine 510. Moreover, the first service node 512 and the first virtual machine 514 are connected to the network 10 through the virtual bridge 516. The virtual bridge 516 has the virtual machine entry table 518 corresponding to the first physical machine 510. The virtual machine entry table 518 is similar to the virtual machine entry table 118, and is used for storing a plurality of entries, where the entries records service IP addresses of the service nodes, the private IP addresses of the virtual machines, the VDCIDs and the MAC addresses of the service nodes and the virtual machines executed on the first physical machine 510.

In detail, when the first service node 512, the first virtual machine 514 and the second service node 530 are initially operated in the data center network system 500, the first service node 512, the first virtual machine 514 and the second service node 530 have to register in the ARP server 520 to record the private IP addresses, the VDCIDs and the MAC addresses thereof. For example, a first mapping 522a of the address query table 522 (shown in FIG. 5B) records the service IP address IP6, the VDCID VDCID6 and the MAC address MACE of the first service node 512, a second mapping 522b of the address query table 522 records the private IP address IP7, the VDCID VDCID7 and the MAC address MAC7 of the first virtual machine 514, and a third mapping 522c of the address query table 522 records the service IP address IP8, the VDCID VDCID8 and the MAC address MAC8 of the second service node 530.

In the present exemplary embodiment, when the first service node 512 wants to communicate with the second service node (i.e., target service node) 530 and broadcasts an ARP request (which is referred to as a third ARP request hereinafter) for querying the MAC address MAC8 of the second service node 530, the virtual bridge 516 adds the VDCID VDCID6 of the first service node 512 to the third ARP request and redirects the third ARP request to the ARP server 520. Particularly, the ARP server 520 transmits the MAC address MAC8 of the second service node 530 to the virtual bridge 516 for providing to the first service node 512. The packet forwarding method of the present exemplary embodiment is described below with reference of a flowchart in collaboration with a schematic diagram of data flows of a communication example executed between the first service node 512 and the second service node 530.

Figure 5C:
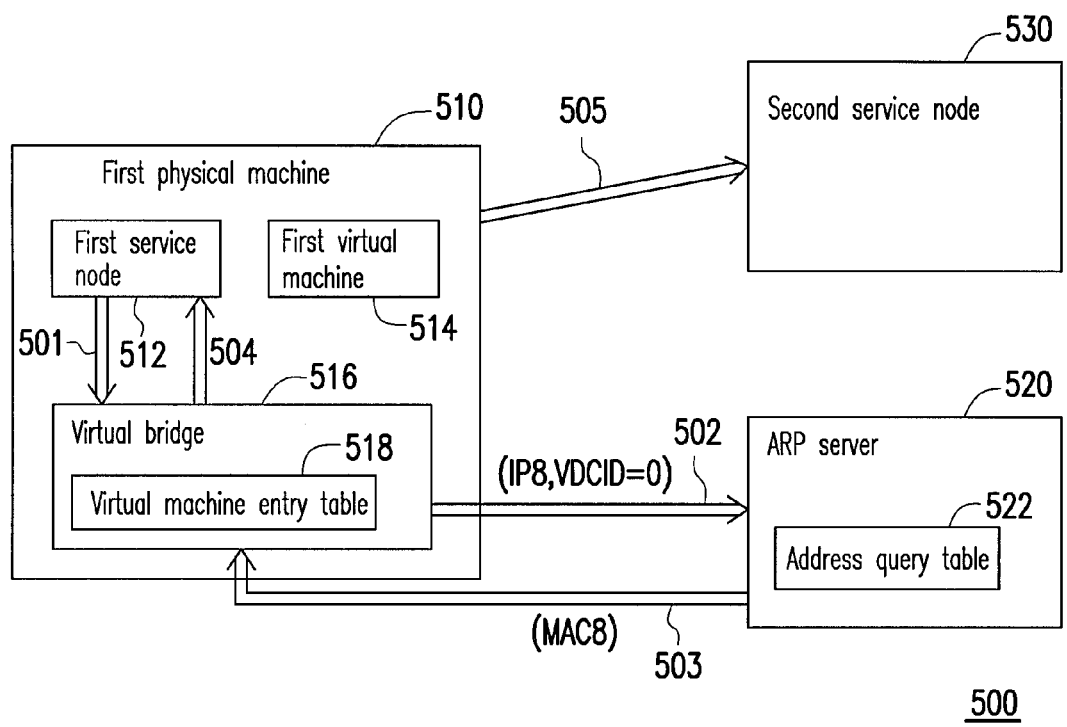
FIG. 5C is a schematic diagram illustrating data flows in communication between a service node and a service node according to the third exemplary embodiment of the disclosure.

FIG. 5C is a schematic diagram illustrating data flows in communication between the first service node 512 and the second service node 530 according to the third exemplary embodiment of the disclosure.

Figure 6:
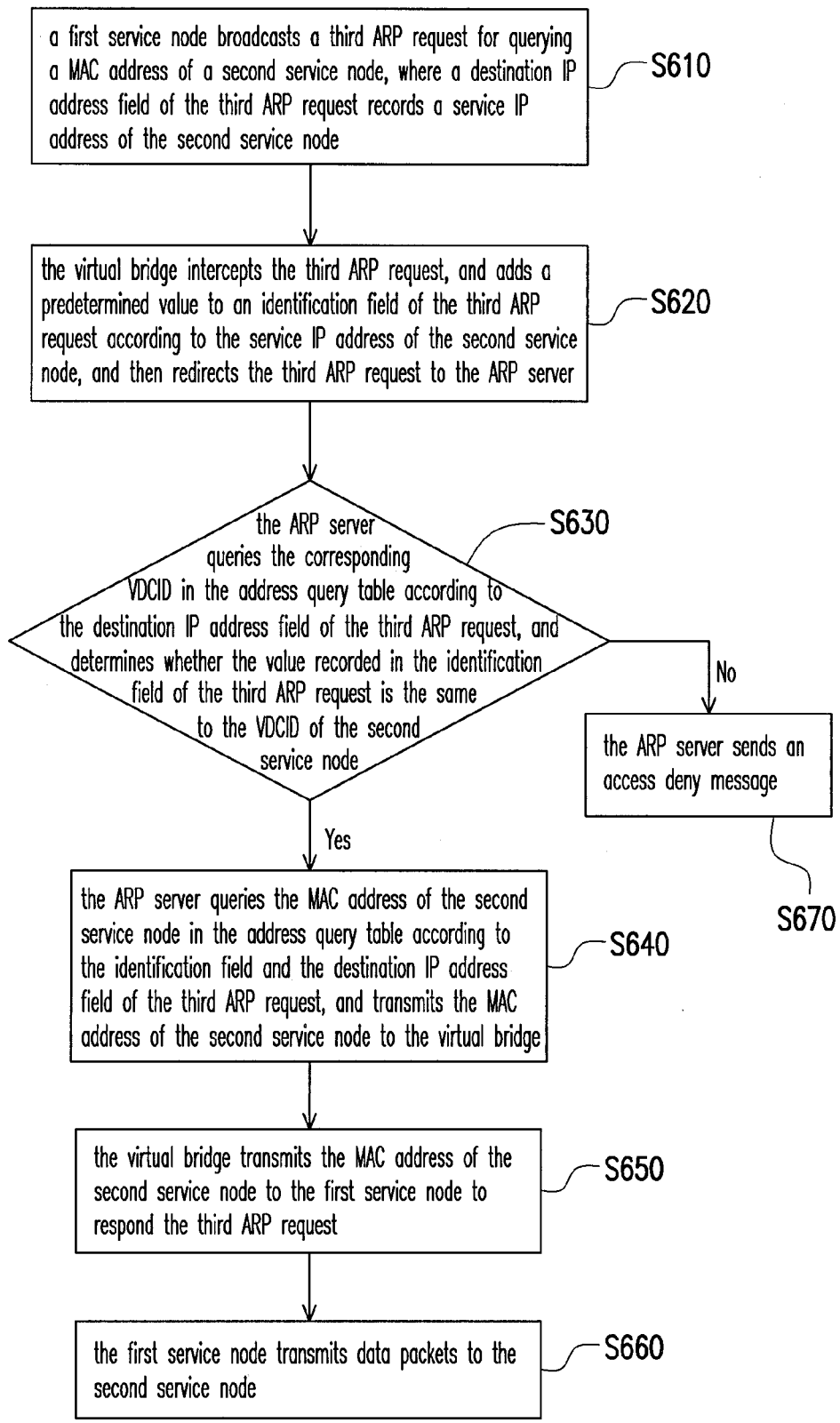
FIG. 6 is a flowchart illustrating a packet forwarding method according to the third exemplary embodiment of the disclosure.

FIG. 6 is a flowchart illustrating the packet forwarding method according to the third exemplary embodiment of the disclosure.

Referring to FIG. 5C and FIG. 6, in step S610, the first service node 512 broadcasts the third ARP request for querying the MAC address MAC8 of the second service node 530, where a destination IP address field of the third ARP request records the service IP address IP8 of the second service node 530.

Similarly, in step S620, the virtual bridge 516 intercepts the third ARP request (shown as a data flow 501), and adds a predetermined value to an identification field of the third ARP request according to the service IP address IP8 of the second service node 530, and then redirects the third ARP request to the ARP server 520 (shown as a data flow 502). In the present exemplary embodiment, the predetermined value can be 0, namely, the VDCIDs of all of the service nodes are set to 0.

Then, in step S630, the ARP server 520 queries the corresponding VDCID (i.e. the VDCID VDCID8 of the second service node 530) in the address query table 522 according to the destination IP address field of the third ARP request, and determines whether the value recorded in the identification field of the third ARP request is the same as the VDCID VDCID8 of the second service node 530.

If yes, in step S640, the ARP server 520 queries the MAC address MAC8 of the second service node 530 in the address query table 522 according to the identification field and the destination IP address field of the third ARP request, and transmits the MAC address MAC8 of the second service node 530 to the virtual bridge 516 (shown as a data flow 503).

In step S650, the virtual bridge 516 transmits the MAC address MAC8 of the second service node 530 to the first service node 512 to respond the third ARP request (shown as a data flow 504). Finally, in step S660, after the first service node 512 obtains the MAC address MAC8 of the second service node 530, it can transmit data packets to the second service node 530 (shown as a data flow 505).

If the value recorded in the identification field of the third ARP request is different to the VDCID VDCID8 of the second service node 530, a step S670 is executed, by which the ARP server 520 sends an access deny message.

In the present exemplary embodiment, by assigning the same specific VDCID to the service nodes, the service nodes and the virtual machines can be identified during the data packet forwarding process.

Fourth Exemplary Embodiment

Figure 7A:
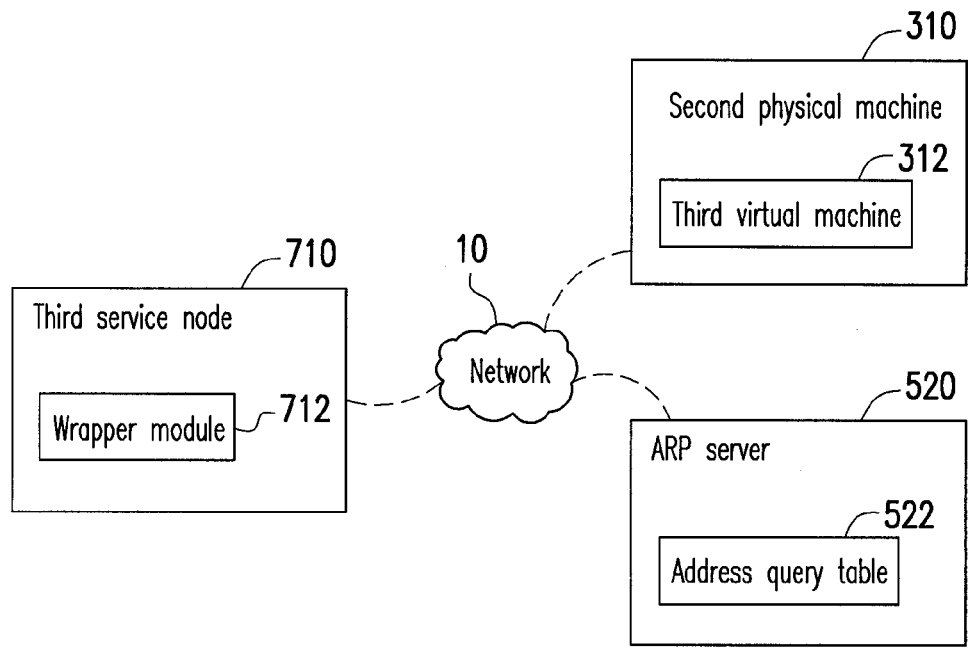
FIG. 7A is a schematic diagram of a data center network system according to a fourth exemplary embodiment of the disclosure.

FIG. 7A is a schematic diagram of a data center network system according to the fourth exemplary embodiment of the disclosure.

Referring to FIG. 7A, the data center network system 700 includes a third service node 710, the ARP server 520 and the third virtual machine 312 executed on the second physical machine 310, where the third service node 710 includes a wrapper module 712. The third service node 710, the ARP server 520 and the second physical machine 310 are all connected to the network 10.

The wrapper module 712 is executed on the third service node 710 and is used for providing a VDCID of a virtual machine to be communicated with the third service node 710. In detail, since the virtual machines belonged to different VDCs can use a same private IP address, when the third service node 710 wants to communicate with a virtual machine and broadcasts an ARP request, the ARP request must include the VDCID of the virtual machine, so that the ARP server 520 can provide the corresponding MAC address.

For example, when a user inputs a private IP address of the third virtual machine 312 for querying the MAC address of the third virtual machine (i.e., target virtual machine) 312 through the wrapper module 712. The wrapper module 712 adds the VDCID of the third virtual machine 312 to the identification field of the fourth ARP request. Particularly, after the fourth ARP request is received, the ARP server 520 transmits the MAC address of the third virtual machine 312 to the third service node 710. The packet forwarding method of the present exemplary embodiment is described below with reference of a flowchart in collaboration with a schematic diagram of data flows of a communication example executed between the third service node 710 and the third virtual machine 312.

Figure 7B:
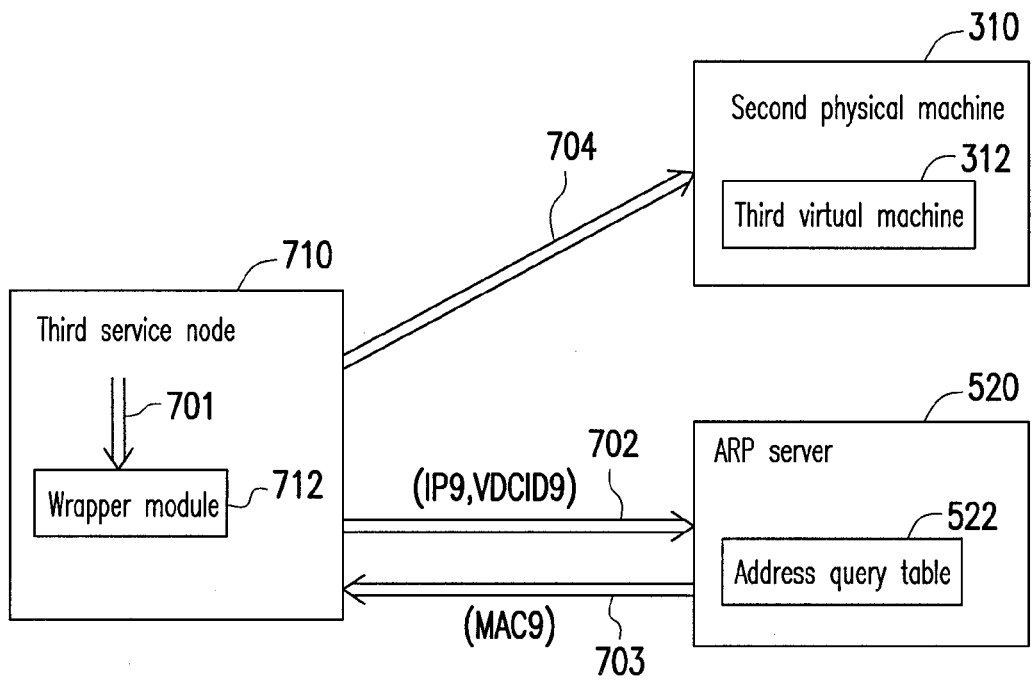
FIG. 7B is a schematic diagram illustrating data flows in communication between a service node and a virtual machine according to the fourth exemplary embodiment of the disclosure.
Figure 8:
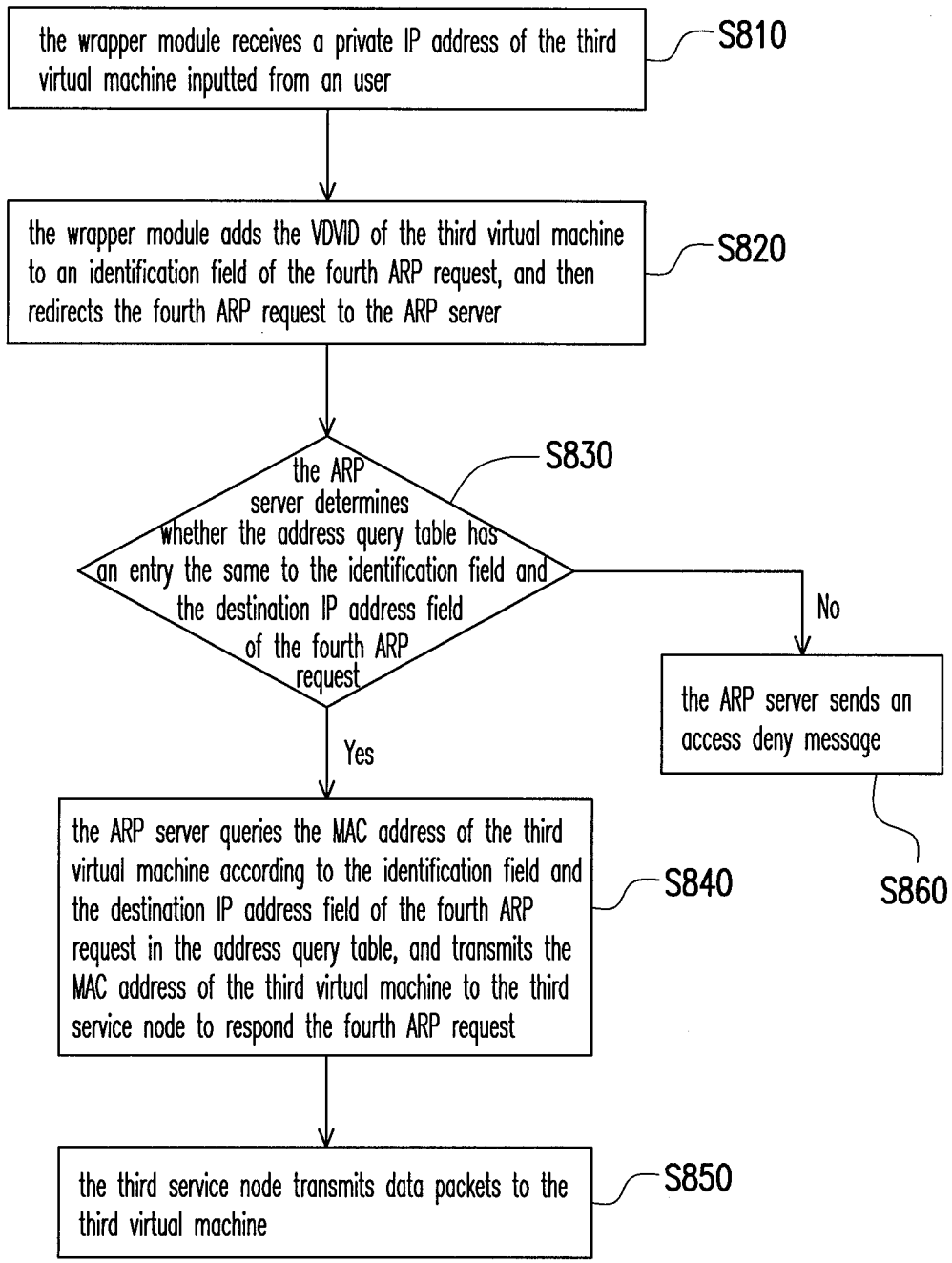
FIG. 8 is a flowchart illustrating a packet forwarding method according to the fourth exemplary embodiment of the disclosure.

FIG. 7B is a schematic diagram illustrating data flows in communication between the third service node 710 and the third virtual machine 312 according to the fourth exemplary embodiment of the disclosure, and FIG. 8 is a flowchart illustrating the packet forwarding method according to the fourth exemplary embodiment of the disclosure.

Referring to FIG. 7B and FIG. 8, in step S810, the wrapper module 712 first receives a private IP address IP9 of the third virtual machine 312 inputted from a user (shown as a data flow 701), for querying for querying the MAC address MAC9 of the third virtual machine 312. Then, the wrapper module 712 records the private IP address IP9 of the third virtual machine 312 in a destination IP address field of the fourth ARP request.

Then, in step S820, the wrapper module 712 intercepts the fourth ARP request (shown as a data flow 701), and adds the VDCID VDCID9 of the third virtual machine 312 to an identification field of the fourth ARP request, and then redirects the fourth ARP request to the ARP server 520 (shown as a data flow 702).

Then, in step S830, the ARP server 520 determines whether the address query table 522 has an entry the same as the identification field and the destination IP address field of the fourth ARP request. In the present exemplary embodiment, the ARP server 520 determines whether the address query table 522 has the entry the same as the VDCID VDCID9 and the IP address IP9 of the third virtual machine 312.

If yes, in step S840, the ARP server 520 queries the MAC address MAC9 of the third virtual machine 312 according to the entry, and transmits the MAC address MAC9 of the third virtual machine 312 to the third service node 710 to respond the fourth ARP request (shown as a data flow 703). Finally, in step S850, after the third service node 710 obtains the MAC address MAC9 of the third virtual machine 312, it can transmit data packets to the third virtual machine 312 (shown as a data flow 704).

If the value recorded in the identification field of the fourth ARP request is different with the VDCID VDCID9 of the third virtual machine 312, a step S860 is executed, by which the ARP server 520 sends an access deny message.

In the present exemplary embodiment, the application that a service node wants to communicate with a virtual machine is, for example, a secure shell (SSH) remote login protocol application. As described above, in the data center network system, the packets are forwarded in a data link layer (i.e. layer-2 forwarding), so that the virtual machines belonged to different VDCs may have a same private IP address. Therefore, the wrapper module has to be used to ensure that the service node obtains the correct MAC address.

Fifth Exemplary Embodiment

Figure 9A:
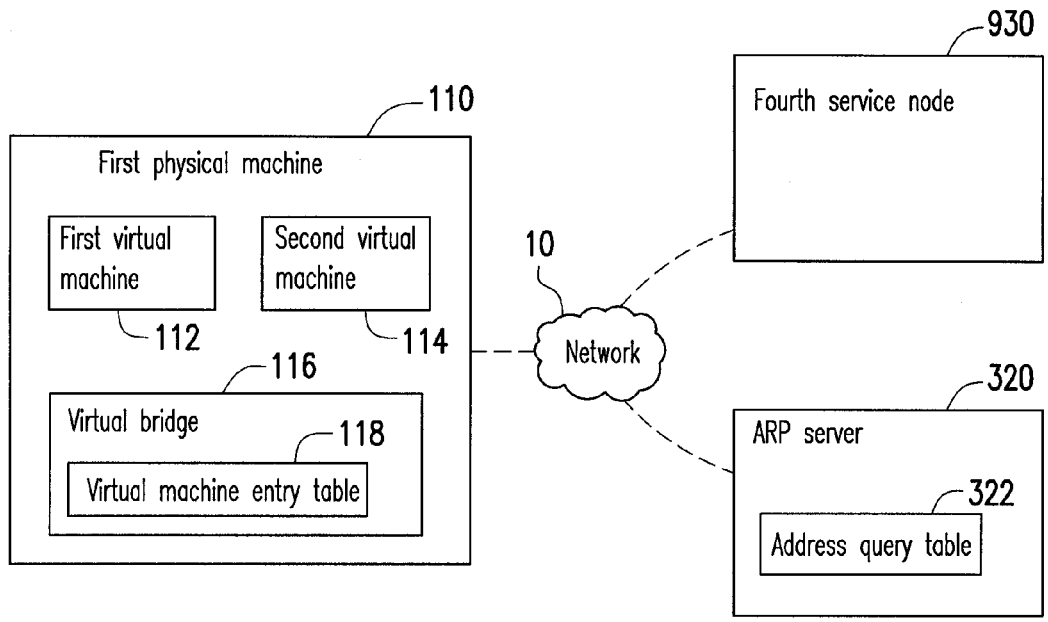
FIG. 9A is a schematic diagram of a data center network system according to a fifth exemplary embodiment of the disclosure.

FIG. 9A is a schematic diagram of a data center network system according to the fifth exemplary embodiment of the disclosure.

Referring to FIG. 9A, the data center network system 900 includes a first physical machine 110, a first virtual machine 112 and a second virtual machine 114 executed on the first physical machine 110, a virtual bridge 116 and a virtual machine entry table 118. The data center network system 900 further includes the ARP server 320 and the fourth service node 930. The first physical machine 110, the ARP server 320 and the fourth service node 930 are all connected to the network 10.

Each of the service nodes has a service IP address, a VDCID and a MAC address. The VDCID of each of the service nodes is set to a same predetermined value, and the predetermined value can be set by those skilled in the art according to an actual requirement, which is not limited by the disclosure.

In detail, when the first virtual machine 112, the second virtual machine 114 and the fourth service node 930 are initially operated in the data center network system 900, the first virtual machine 112, the second virtual machine 114 and the fourth service node 930 have to register in the ARP server 320 to record the private IP addresses, the VDCIDs and the MAC addresses thereof. A service IP address IP10, a VDCID VDCID10 and a MAC address MAC10 of the fourth service node 930 are recorded in the address query table 322.

In the present exemplary embodiment, when the first virtual machine 112 wants to communicate with the fourth service node (i.e., target service node) 930 and broadcasts an ARP request (which is referred to as a fifth ARP request hereinafter) for querying the MAC address MAC10 of the fourth service node 930, the virtual bridge 116 adds a predetermined value of the VDCID to the fifth ARP request and redirects the fifth ARP request to the ARP server 320. Particularly, the ARP server 320 transmits the MAC address MAC10 of the fourth service node 930 to the virtual bridge 116 for providing to the first service node 112. In the present exemplary embodiment, the predetermined value can be 0, namely, the VDCIDs of all of the service nodes are set to 0. The packet forwarding method of the present exemplary embodiment is described below with reference of a flowchart in collaboration with a schematic diagram of data flows of a communication example executed between the first virtual machine 112 and the fourth service node 930.

Figure 9B:
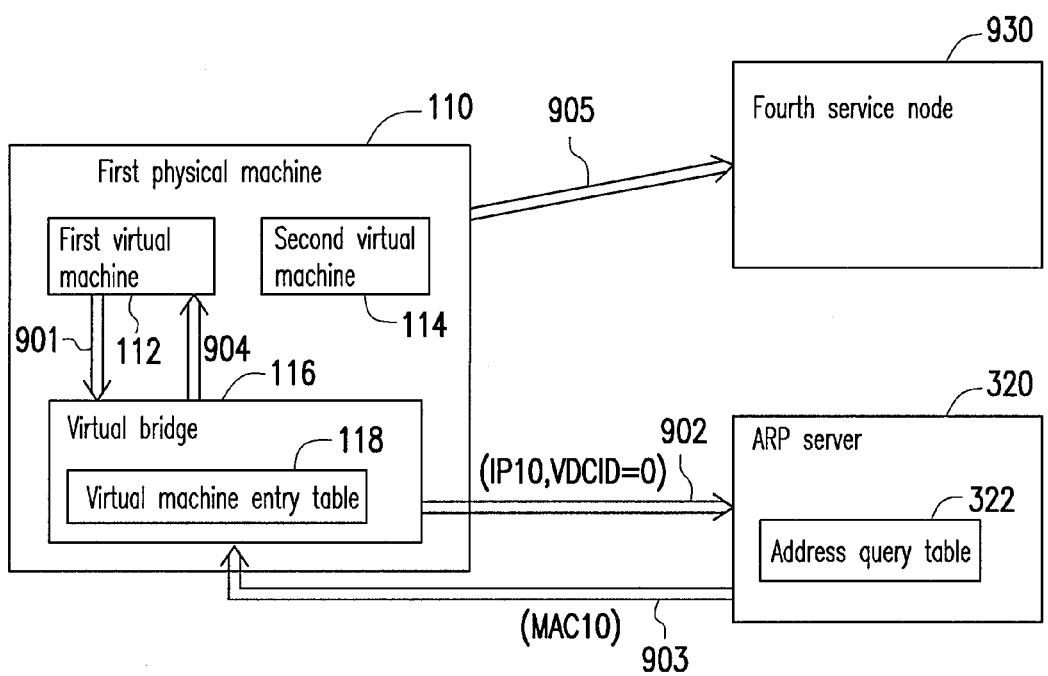
FIG. 9B is a schematic diagram illustrating data flows in communication between a virtual machine and a service node according to the fifth exemplary embodiment of the disclosure.
Figure 10:
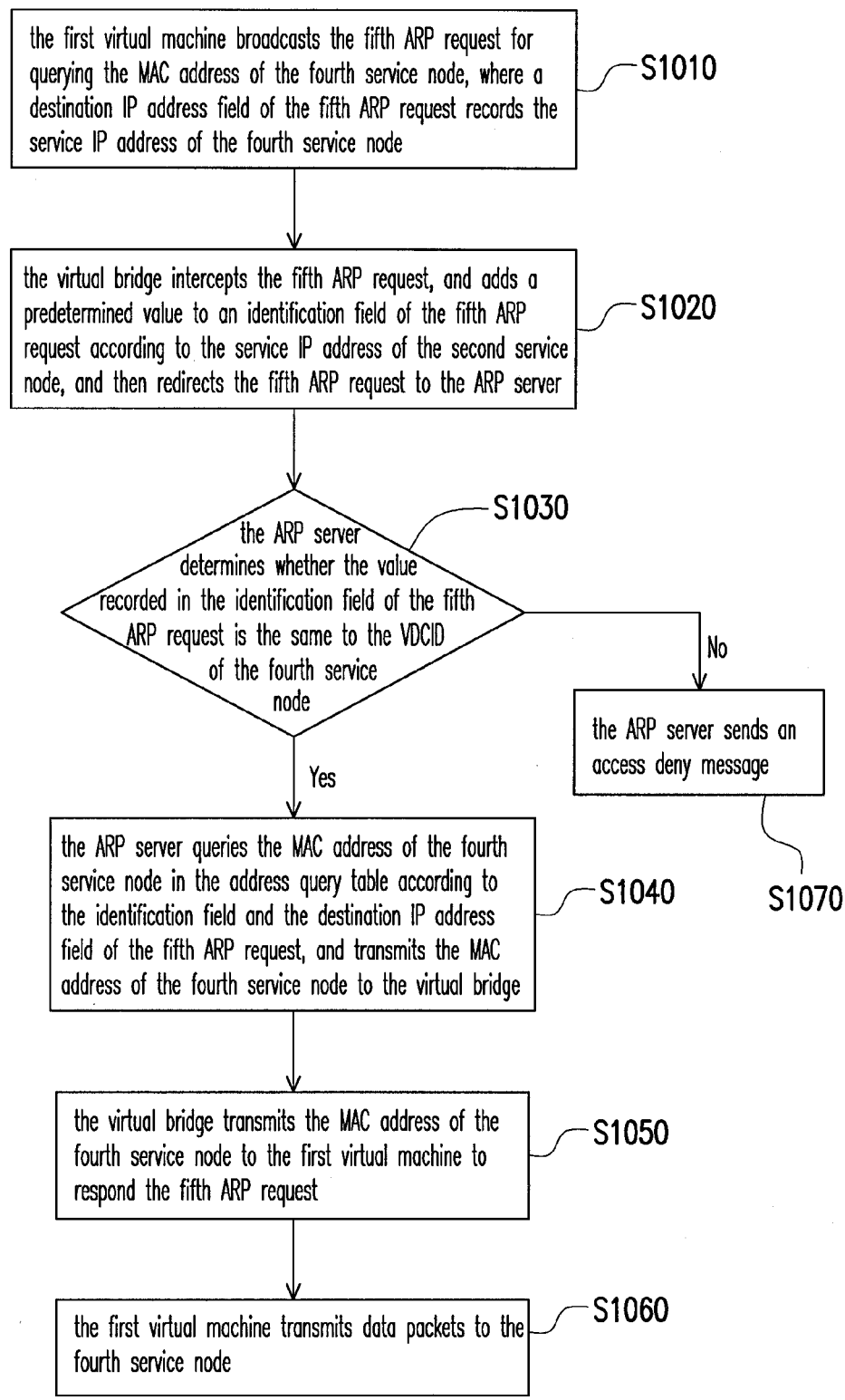
FIG. 10 is a flowchart illustrating a packet forwarding method according to the fifth exemplary embodiment of the disclosure.

FIG. 9B is a schematic diagram illustrating data flows in communication between the first virtual machine 112 and the fourth service node 930 according to the fifth exemplary embodiment of the disclosure. FIG. 10 is a flowchart illustrating the packet forwarding method according to the fifth exemplary embodiment of the disclosure.

Referring to FIG. 9B and FIG. 10, in step S1010, the first virtual machine 112 broadcasts the fifth ARP request for querying the MAC address MAC10 of the fourth service node 930, where a destination IP address field of the fifth ARP request records the service IP address IP10 of the fourth service node 930.

Similarly, in step S1020, the virtual bridge 116 intercepts the fifth ARP request (shown as a data flow 901), and adds a predetermined value to an identification field of the fifth ARP request according to the service IP address IP10 of the fourth service node 930, and then redirects the fifth ARP request to the ARP server 320 (shown as a data flow 902).

Then, in step S1030, the ARP server 320 queries the VDCID VDCID10 of the fourth service node 930 in the address query table 322 according to the service IP address IP10 of the fourth service node 930, and determines whether the value recorded in the identification field of the fifth ARP request is the same as the VDCID VDCID10 of the fourth service node 930.

If yes, in step S1040, the ARP server 320 queries the MAC address MAC10 of the fourth service node 930 in the address query table 322 according to the identification field and the destination IP address field of the fifth ARP request, and transmits the MAC address MAC10 of the fourth service node 930 to the virtual bridge 116 (shown as a data flow 903).

In step S1050, the virtual bridge 116 transmits the MAC address MAC10 of the fourth service node 930 to the first virtual machine 112 to respond the fifth ARP request (shown as a data flow 904). Finally, in step S1060, after the first virtual machine 112 obtains the MAC address MAC10 of the fourth service node 930, it can transmit data packets to the fourth service node 930 (shown as a data flow 905).

If the value recorded in the identification field of the fifth ARP request is different to the VDCID VDCID10 of the fourth service node 930, a step S1070 is executed, by which the ARP server 320 sends an access deny message.

In the present exemplary embodiment, by assigning the same specific VDCID to the service nodes, the service nodes and the virtual machines can be identified during the data packet forwarding process.

Sixth Exemplary Embodiment

Figures 11A, 11B:
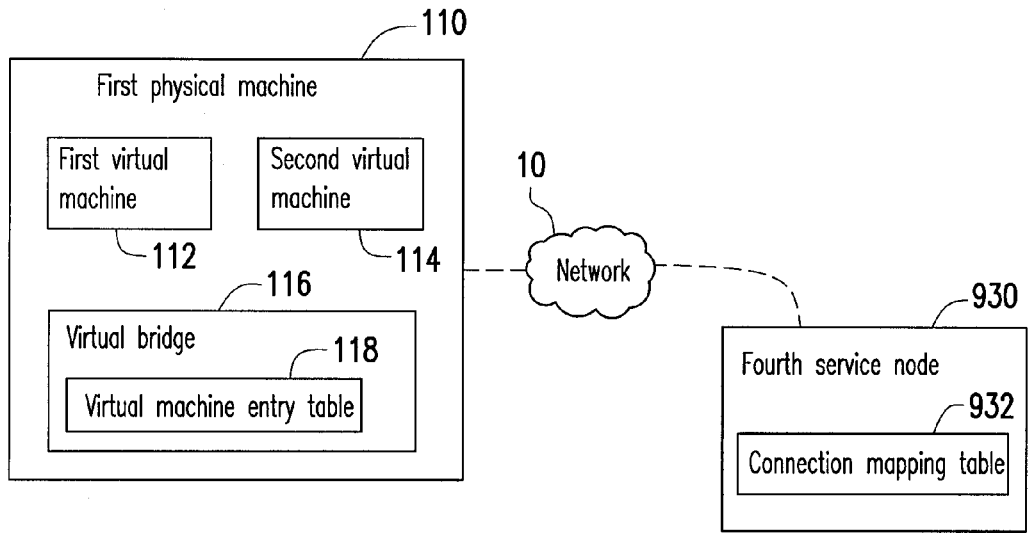
FIG. 11A is a schematic diagram of a data center network system according to a sixth exemplary embodiment of the disclosure.
FIG. 11B is an implementation of a connection mapping table 932 according to the sixth exemplary embodiment of the disclosure.

FIG. 11A is a schematic diagram of a data center network system according to a sixth exemplary embodiment of the disclosure.

Referring to FIG. 11A, besides the first physical machine 110, the first virtual machine 112, the second virtual machine 114, the virtual bridge 116 and the virtual machine entry table 118, the data center network system 1100 further includes a fourth service node 930. The fourth service node 930 has a connection mapping table 932. The data center network system of the sixth exemplary embodiment and that of the fifth exemplary embodiment have the same structure, so that descriptions of various components of the data center network system are not repeated.

A difference between the sixth exemplary embodiment and the fifth exemplary embodiment is that when the first virtual machine 112 successfully forwards the data packet to the fourth service node (i.e., target service node) 930 (shown as the data flow 905), the fourth service node 930 records related information of the first virtual machine 112 in a connection mapping table 932 thereof. For example, a first connection 932a of the connection mapping table 932 records a source IP address SRC_IP1, a source port SRC_PORT1, a destination IP address DST_IP1, a destination port DST_PORT2 and a MAC address MAC11 of the first virtual machine 112 (shown in FIG. 11B).

Particularly, in the present exemplary embodiment, when the fourth service node 930 is required to transmit a related response to the first virtual machine 112 after receiving the data packet forwarded by the first virtual machine 112, the fourth service node 930 transmits a data packet according to the MAC address recorded in the connection mapping table 932. The packet forwarding method of the present exemplary embodiment is described below with reference of a flowchart in collaboration with a schematic diagram of data flows of a communication example executed between the first virtual machine 112 and the fourth service node 930.

Figure 11C:
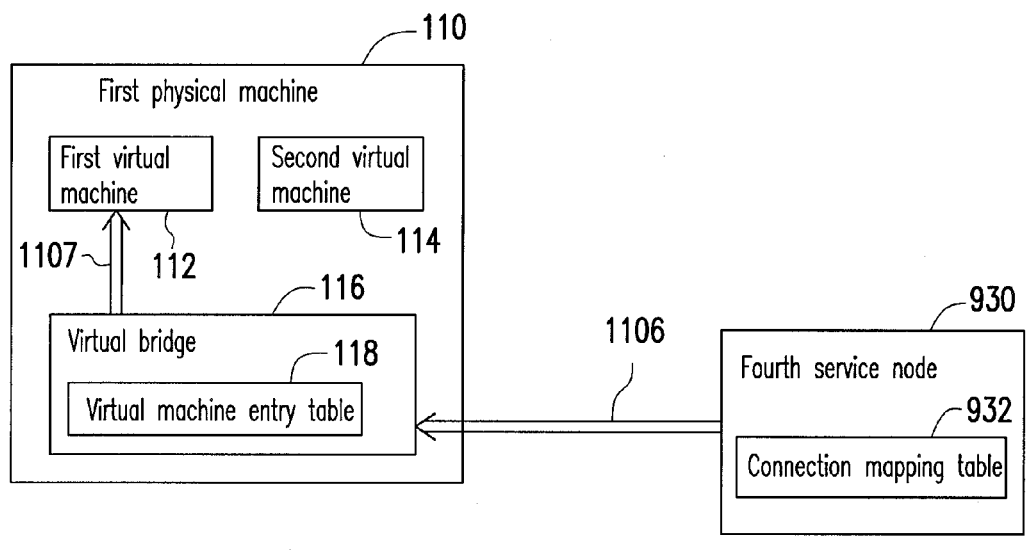
FIG. 11C is a schematic diagram illustrating data flows in communication between a virtual machine a service node according to the sixth exemplary embodiment of the disclosure.
Figure 12:
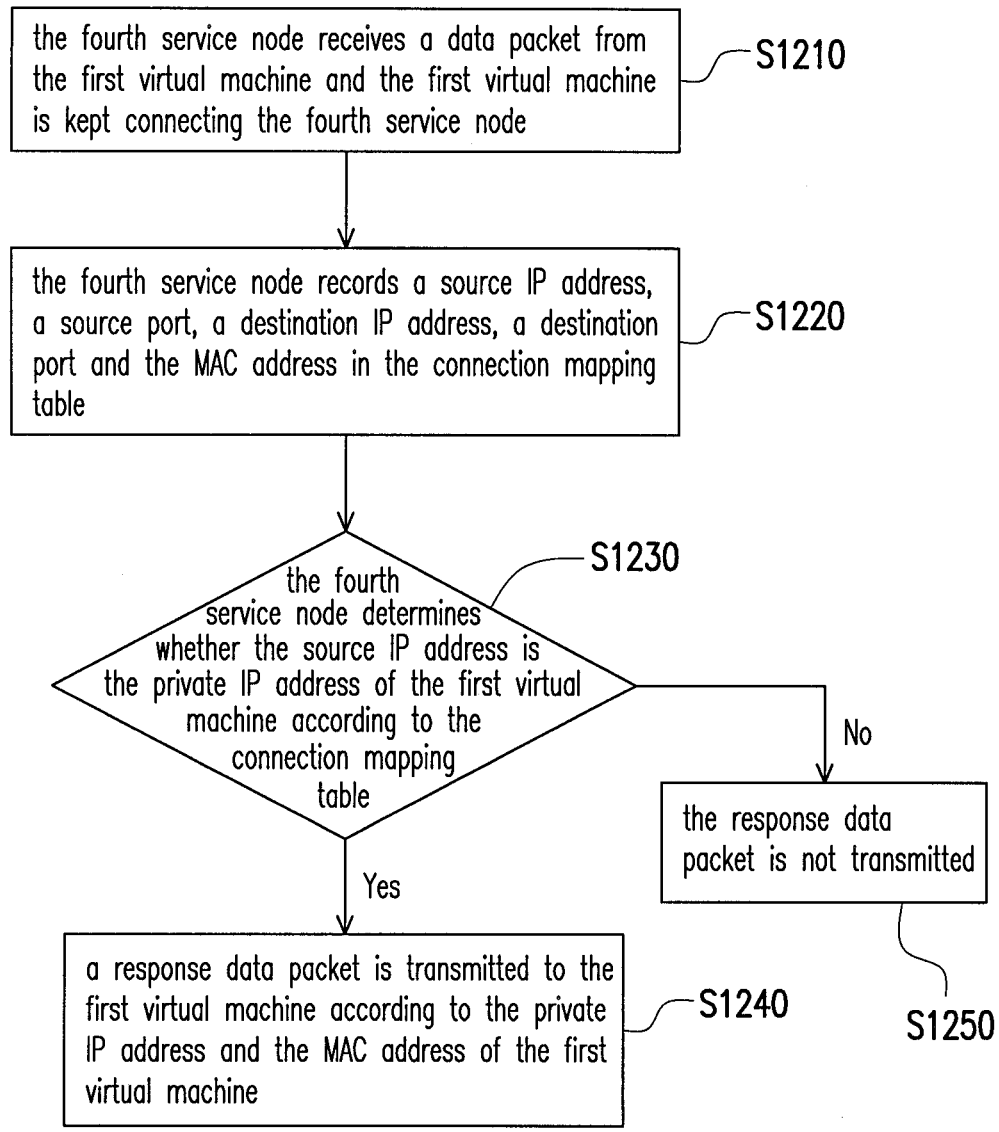
FIG. 12 is a flowchart illustrating a packet forwarding method according to the sixth exemplary embodiment of the disclosure.

FIG. 11C is a schematic diagram illustrating data flows in communication between the first virtual machine 112 and the fourth service node 930 according to the sixth exemplary embodiment of the disclosure. FIG. 12 is a flowchart illustrating the packet forwarding method according to the sixth exemplary embodiment of the disclosure.

Referring to FIG. 11C and FIG. 12, in step S1210, the fourth service node 930 receives a data packet from the first virtual machine 112 and the first virtual machine 112 is kept connecting the fourth service node 930, namely, the communication between the fourth service node 930 and the first virtual machine 112 is started from the first virtual machine 112. Then, in step S1220, the fourth service node 930 records the source IP address SRC_IP1, the source port SRC_PORT1, the destination IP address DST_IP1, the destination port DST_PORT2 and the MAC address MAC11 in the connection mapping table 932 according to the received data packet. In the present exemplary embodiment, the source IP address SRC_IP1 and the MAC address MAC11 are respectively the private IP address and the MAC address of the first virtual machine 112.

Then, in step S1230, the fourth service node 930 determines whether the source IP address SRC_IP1 is the private IP address of the first virtual machine 112 according to the first connection 932a in the connection mapping table 932. If yes, a step S1240 is executed, by which the fourth service node 930 queries the source IP address SRC_IP1 and the MAC address MAC11 of the first connection 932a (i.e. the private IP address and the MAC address of the first virtual machine 112), and transmits a response data packet to the virtual bridge 116 (shown as a data flow 1106) according to the source IP address SRC_IP1 and the MAC address MAC11 of the first connection 932a, and the virtual bridge 116 transmits the response data packet to the first virtual machine 112 (shown as a data flow 1107). If not, a step S1250 is executed, and the response data packet is not transmitted.

Seventh Exemplary Embodiment

Figures 13A, 13B:
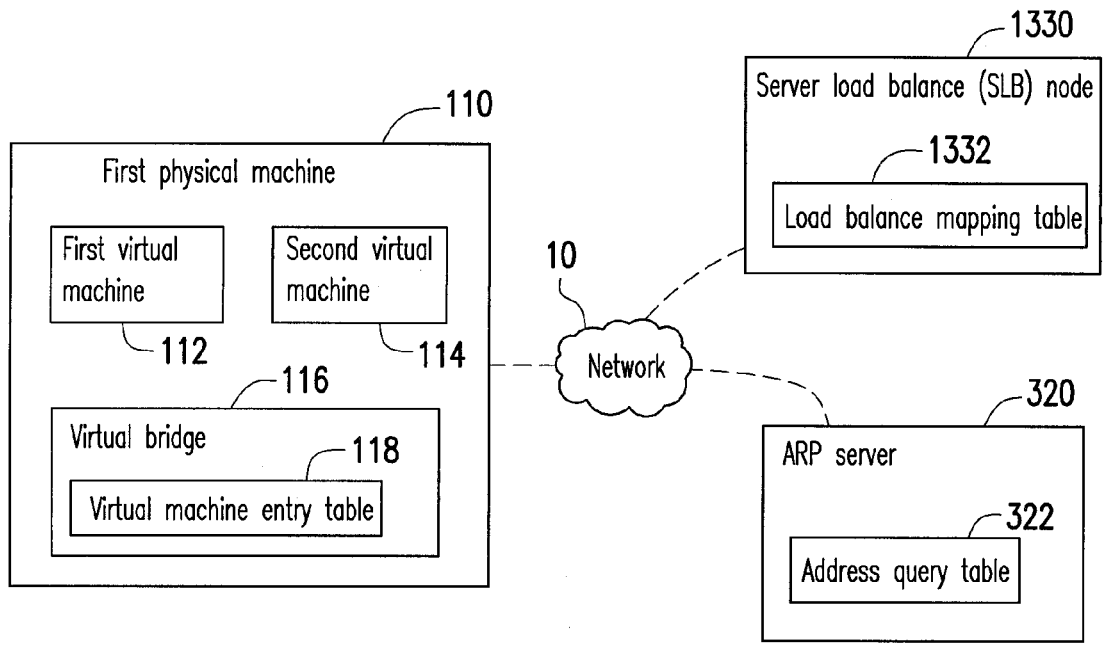
FIG. 13A is a schematic diagram of a data center network system according to a seventh exemplary embodiment of the disclosure.
FIG. 13B is an implementation of a load balance mapping table 1332 according to the seventh exemplary embodiment of the disclosure.

FIG. 13A is a schematic diagram of a data center network system according to a seventh exemplary embodiment of the disclosure.

Referring to FIG. 13A, besides the first physical machine 110, the first virtual machine 112, the second virtual machine 114, the virtual bridge 116 and the virtual machine entry table 118, the data center network system 1300 further includes the ARP server 320 and a server load balance (SLB) node 1330. The first physical machine 110, the ARP server 320 and the SLB node 1330 are all connected to the network 10.

In detail, the SLB node 1330 has a load balance mapping table 1332 (shown in FIG. 13B), and the load balance mapping table 1332 stores a plurality of mappings, where the mapping stores an IP address of a destination IP address field and a value of a VDCID field in a data packet received from an external link. For example, a first mapping 1332a of the load balance mapping table 1332 records a private IP address IP12 of a destination IP address field and a VDCID VDCID12 in a data packet received from an external link.

For example, when the SLB node 1330 receives a data packet to be transmitted to the first virtual machine 112 from an external link, the SLB node 1330 queries the private IP address and the VDCID of the first virtual machine 112 according to the load balance mapping table 1332, and broadcasts an ARP request (which is referred to as a seventh ARP request hereinafter) for querying the MAC address MAC12 of the first virtual machine 112. Particularly, the ARP server 320 receives the seventh ARP request and transmits the MAC address MAC12 of the first virtual machine 112 to the SLB node 1330. A packet forwarding method of the present exemplary embodiment is described below with reference of a flowchart in collaboration with a schematic diagram of data flows in a communication example for forwarding a data packet from the external link to the first virtual machine 112.

Figure 13C:
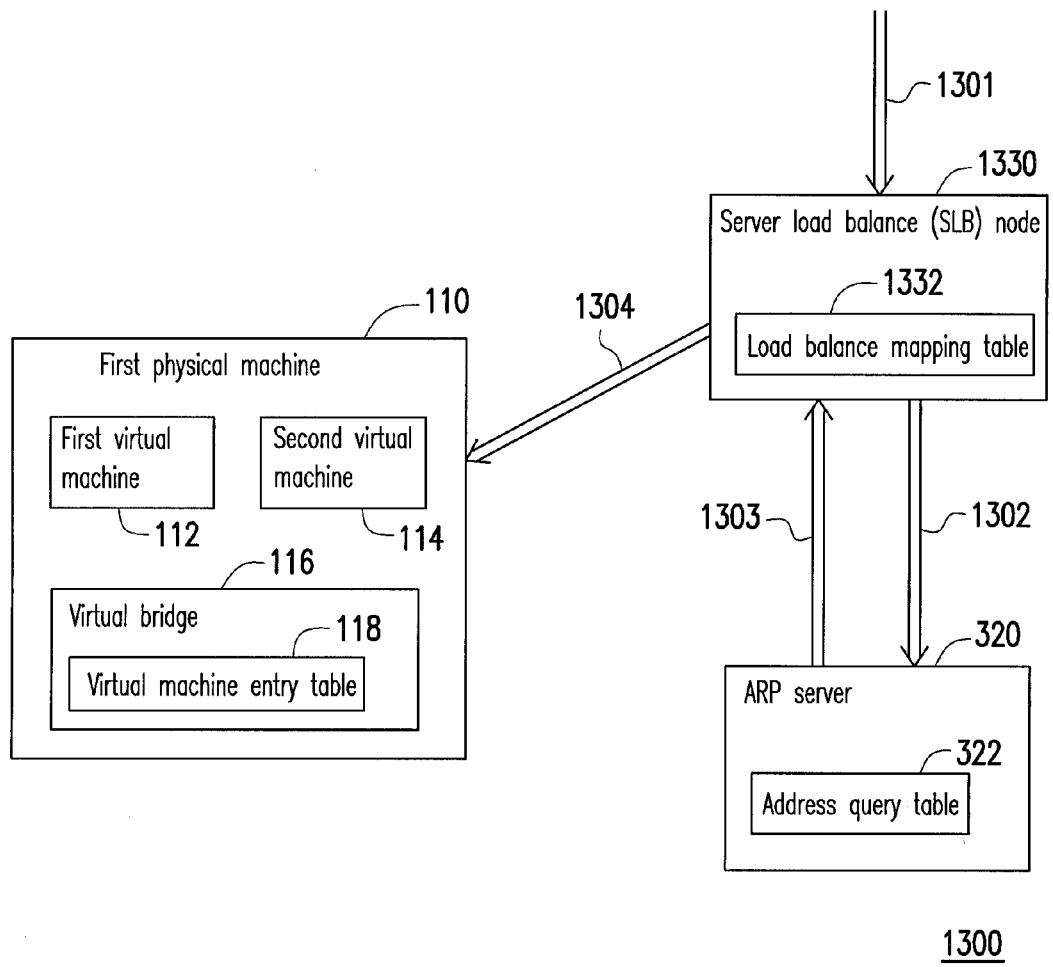
FIG. 13C is a schematic diagram illustrating data flows when a server load balance node forwards a data packet from an external link to a virtual machine according to the seventh exemplary embodiment of the disclosure.
Figure 14:
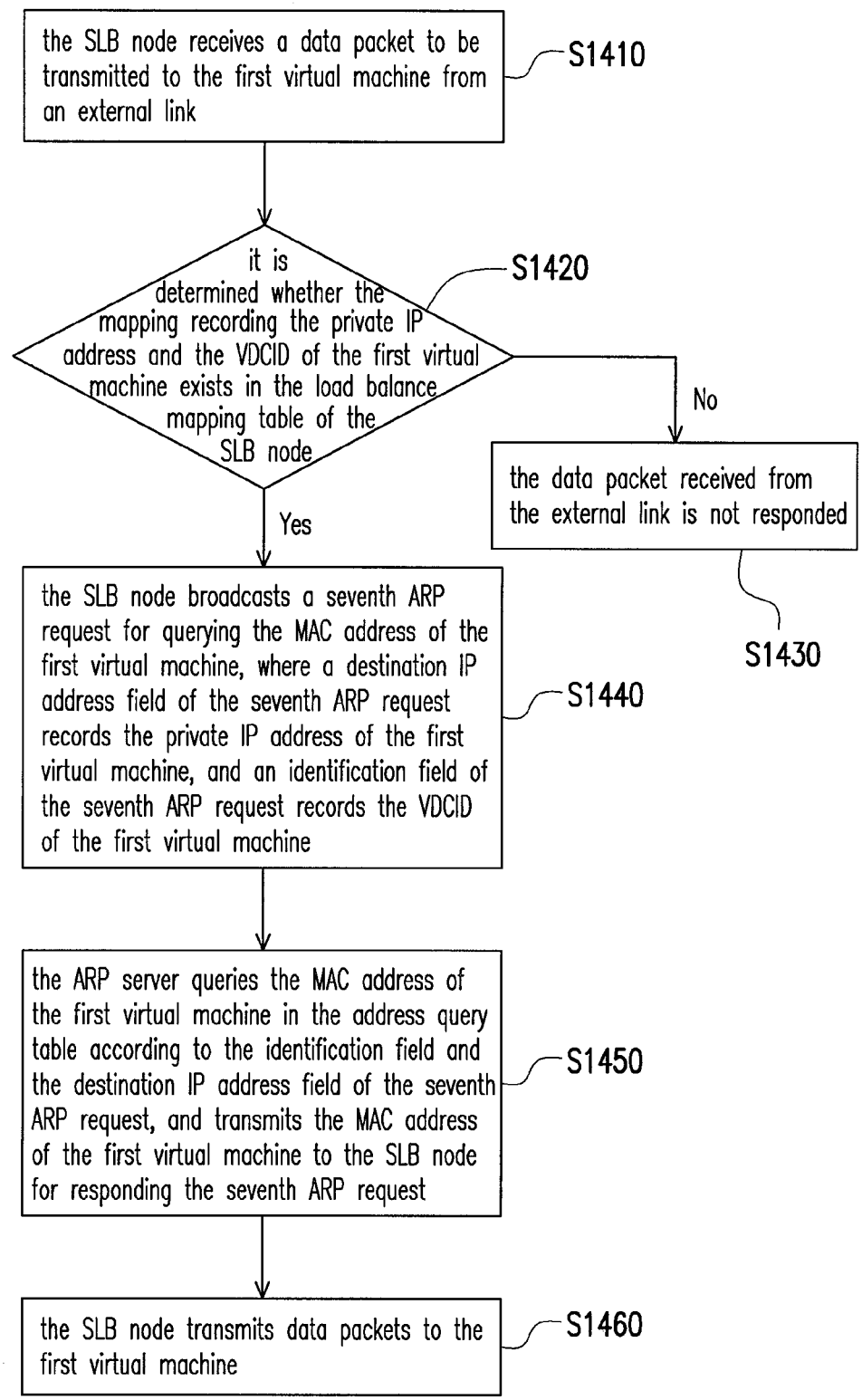
FIG. 14 is a flowchart illustrating a packet forwarding method according to the seventh exemplary embodiment of the disclosure.

FIG. 13C is a schematic diagram illustrating data flows when the SLB node 1330 forwards a data packet from the external link to the first virtual machine 112 according to the seventh exemplary embodiment of the disclosure, and FIG. 14 is a flowchart illustrating a packet forwarding method according to the seventh exemplary embodiment of the disclosure.

Referring to FIG. 13C and FIG. 14, in step S1410, the SLB node 1330 receives a data packet to be transmitted to the first virtual machine 112 from an external link (shown as a data flow 1301). Then, in step S1420, it is determined whether the mapping recording the private IP address and the VDCID of the first virtual machine 112 exists in the load balance mapping table 1332 of the SLB node 1330.

If not, the data packet received from the external link is not responded (step S1430). If yes, in step S1440, the SLB node 1330 broadcasts the seventh ARP request for querying the MAC address of the first virtual machine 112 (shown as a data flow 1302), where a destination IP address field of the seventh ARP request records the private IP address of the first virtual machine 112, and an identification field of the seventh ARP request records the VDCID of the first virtual machine 112.

Then, in step S1450, the ARP server 320 queries the MAC address of the first virtual machine 112 in the address query table 322 according to the identification field and the destination IP address field of the seventh ARP request, and transmits the MAC address of the first virtual machine 112 to the SLB node 1330 (shown as a data flow 1303).

Finally, in the step S1460, the SLB node 1330 can transmit data packets to the first virtual machine 112 after obtaining the MAC address of the first virtual machine 112 (shown as a data flow 1304).

In summary, according to the packet forwarding method of the disclosure, each VDC is assigned with a unique VDCID, and by simultaneously querying the private IP address and the VDCID, the correct MAC address can be obtained. In this way, the same data center network system can reuse the same private IP address, so as to effectively resolve the problem of reassigning the private IP addresses. Moreover, only the virtual machines belonged to the same VDC can transmit data to each other, so as to maintain data confidentiality of the data center network system.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A data center network system, comprising:
a virtual bridge, connected to a network;
an address resolution protocol (ARP) server, connected to the network;
a plurality of virtual machines, wherein a first virtual machine in the plurality of virtual machines is executed on a physical machine and is connected to the network through the virtual bridge, each of the plurality of virtual machines has a private Internet protocol (IP) address, a virtual data center identification (VDCID) and a media access control (MAC) address, the plurality of virtual machines is respectively belonged to a plurality of virtual data centers (VDCs), and the plurality of virtual machines belonged to the same VDC has the same VDCID
a first service node, connected to the network and having a wrapper module; and
a second service node, connected to the network,
wherein the virtual bridge intercepts an first ARP request from the first virtual machine for querying a MAC address of a target virtual machine, adds a corresponding virtual data center identification (VDCID) to an identification field of the first ARP request and redirects the first ARP request,
wherein the ARP server queries a corresponding MAC address according to an IP address recorded in a destination IP address field of the first ARP request and the corresponding VDCID recorded in the identification field of the first ARP request, and transmits the corresponding MAC address in response to the first ARP request,
wherein the target virtual machine is executed on the physical machine and connected to the network through the virtual bridge,
wherein the virtual bridge determines whether the VDCID of the first virtual machine is the same as the VDCID of the target virtual machine according to a virtual machine entry table stored in the virtual bridge, and
when the VDCID of the first virtual machine is the same as the VDCID of the target virtual machine, the virtual bridge forwards the MAC address of the target virtual machine to the first virtual machine according to the virtual machine entry table,
wherein the ARP server maintains an address query table, the address query table stores a plurality of mappings, and the mappings of the address query table record the private IP address, the VDCID and the MAC address of each of the plurality of virtual machines,
wherein the first service node broadcasts a second ARP request for querying the MAC address of a second virtual machine in the plurality of virtual machines, wherein a destination IP address field of the second ARP request records the private IP address of the second virtual machine, and the wrapper module adds the VDCID of the second virtual machine to an identification field of the second ARP request,
wherein the ARP server queries the MAC address of the second virtual machine in the address query table according to the identification field and the destination IP address field of the second ARP request, and transmits the MAC address of the second virtual machine to the first service node to respond the second ARP request,
wherein the mappings of the address query table further record a service IP address, a VDCID and a MAC address of the second service node, and the VDCID of the second service node is set to a predetermined value,
wherein the first virtual machine broadcasts a third ARP request for querying the MAC address of the second service node, where a destination IP address field of the third ARP request records the service IP address of the second service node, wherein the virtual bridge intercepts the third ARP request, and adds the predetermined value to an identification field of the third ARP request according to the service IP address of the second service node, and then redirects the third ARP request to the ARP server, the ARP server queries the MAC address of the second service node in the address query table according to the identification field and the destination IP address field of the third ARP request, and transmits the MAC address of the second service node to the virtual bridge, wherein the virtual bridge transmits the MAC address of the second service node to the first virtual machine to respond the third ARP request.

2. The data center network system as claimed in claim 1, wherein the target virtual machine is executed on another physical machine, wherein the virtual bridge adds the VDCID of the first virtual machine to the identification field of the first ARP request, and redirects the first ARP request to the ARP server, wherein the ARP server queries the VDCID of the target virtual machine in the address query table, and determines whether a value recorded in the identification field of the first ARP request is the same as the VDCID of the target virtual machine, wherein when the value recorded in the identification field of the first ARP request is the same as the VDCID of the target virtual machine, the ARP server transmits the MAC address of the target virtual machine to the virtual bridge according to the address query table, and the virtual bridge transmits the MAC address of the target virtual machine to the first virtual machine in response to the first ARP request.

3. The data center network system as claimed in claim 1, further a target service node connected to the network.

4. The data center network system as claimed in claim 3, wherein the virtual bridge intercepts another ARP request from the first virtual machine for querying a MAC address of the target service node, adds a predetermined value to an identification field of the other ARP request and redirects the other ARP request to the ARP server, the ARP server queries the MAC address of the target service node in an address query table according to the identification field and a destination IP address field of the other ARP request, and transmits the MAC address of the target service node to the virtual bridge, wherein the virtual bridge transmits the MAC address of the target service node to the first virtual machine in response to the other ARP request.

5. The data center network system as claimed in claim 3, further comprises a service node connected to the network through the virtual bridge, wherein the service node broadcasts another ARP request for querying the MAC address of the target service node, wherein the virtual bridge intercepts the other ARP request, and adds a predetermined value to an identification field of the other ARP request, and redirects the other ARP request to the ARP server, wherein the ARP server queries the MAC address of the target service node in an address query table according to the identification field and a destination IP address field of the other ARP request, and transmits the MAC address of the target service node to the virtual bridge, wherein the virtual bridge transmits the MAC address of the target service node to the service node in response to the other ARP request.

6. The data center network system as claimed in claim 4, wherein when the target service node receives a data packet from the first virtual machine, the target service node records the private IP address and the MAC address of the first virtual machine in a connection mapping table according to a source IP address, a source port, a destination IP address, a destination port and a MAC address of the data packet, wherein the target service node queries the private IP address and the MAC address of the first virtual machine according to the connection mapping table, and transmits a response data packet to the first virtual machine according to the private IP address and the MAC address of the first virtual machine.

7. The data center network system as claimed in claim 1, further a server load balance (SLB) node having a load balance mapping table and connected to the network, wherein the SLB node receives a data packet to be transmitted to the first virtual machine from an external link, and the SLB node queries the private IP address and the VDCID of the first virtual machine according to the load balance mapping table, wherein the SLB node broadcasts another ARP request for querying the MAC address of the first virtual machine, wherein a destination IP address field of the other ARP request records the private IP address of the first virtual machine, and an identification field of the other ARP request records the VDCID of the first virtual machine, wherein the ARP server queries the MAC address of the first virtual machine in the address query table according to the identification field and the destination IP address field of the other ARP request, and transmits the MAC address of the first virtual machine to the SLB node.

8. A data center network system, comprising:
a first physical machine, connected to a network;
a virtual bridge, executed on the first physical machine and connected to the network; and
an address resolution protocol (ARP) server, connected to the network,
wherein the virtual bridge intercepts an address resolution protocol (ARP) request having an identification field and a destination IP address field, adds a corresponding virtual data center identification (VDCID) to the identification field of the ARP request and redirects the ARP request to the ARP server,
wherein the ARP server queries a corresponding MAC address according to an IP address recorded in the destination IP address field of the ARP request and the corresponding VDCID recorded in the identification field of the ARP request, and transmits the corresponding MAC address in response to the ARP request,
wherein the data center network system further comprises:
a plurality of virtual machines, wherein each of the plurality of virtual machines has a private Internet protocol (IP) address, a virtual data center identification (VDCID) and a media access control (MAC) address, the plurality of virtual machines is respectively belonged to a plurality of virtual data centers (VDCs), and the plurality of virtual machines belonged to the same VDC has the same VDCID,
a first service node, connected to the network and having a wrapper module,
a second service node, connected to the network,
wherein a first virtual machine and a second virtual machine in the plurality of virtual machines are executed on the first physical machine and are connected to the network through the virtual bridge, wherein the virtual bridge has a virtual machine entry table corresponding to the first physical machine, the virtual machine entry table stores a plurality of entries, a first entry in the entries records the private IP address, the VDCID and the MAC address of the first virtual machine, and a second entry in the entries records the private IP address, the VDCID and the MAC address of the second virtual machine, wherein the first virtual machine broadcasts a first address resolution protocol (ARP) request for querying the MAC address of the second virtual machine, wherein a destination IP address field of the first ARP request records the private IP address of the second virtual machine, wherein the virtual bridge intercepts the first ARP request and determines whether the VDCID of the first virtual machine is the same as the VDCID of the second virtual machine according to the virtual machine entry table corresponding to the first physical machine, and when the VDCID of the first virtual machine is the same as the VDCID of the second virtual machine, the virtual bridge forwards the MAC address of the second virtual machine to the first virtual machine according to the virtual machine entry table corresponding to the first physical machine in response to the first ARP request, wherein the ARP server maintains an address query table, the address query table stores a plurality of mappings, and the mappings of the address query table record the private IP address, the VDCID and the MAC address of each of the plurality of virtual machines, wherein the first service node broadcasts a second ARP request for querying the MAC address of a third virtual machine in the plurality of virtual machines, wherein a destination IP address field of the second ARP request records the private IP address of the third virtual machine, and the wrapper module adds the VDCID of the third virtual machine to an identification field of the second ARP request, wherein the ARP server queries the MAC address of the third virtual machine in the address query table according to the identification field and the destination IP address field of the second ARP request, and transmits the MAC address of the third virtual machine to the first service node to respond the second ARP request, wherein the mappings of the address query table further record a service IP address, a VDCID and a MAC address of the second service node, and the VDCID of the second service node is set to a predetermined value, wherein the first virtual machine broadcasts a third ARP request for querying the MAC address of the second service node, where a destination IP address field of the third ARP request records the service IP address of the second service node, wherein the virtual bridge intercepts the third ARP request, and adds the predetermined value to an identification field of the third ARP request according to the service IP address of the second service node, and then redirects the third ARP request to the ARP server, the ARP server queries the MAC address of the second service node in the address query table according to the identification field and the destination IP address field of the third ARP request, and transmits the MAC address of the second service node to the virtual bridge, wherein the virtual bridge transmits the MAC address of the second service node to the first virtual machine to respond the third ARP request.

9. The data center network system as claimed in claim 8, further comprising:

a second physical machine, connected to the network, wherein the third virtual machine in the plurality of virtual machines is executed on the second physical machine, wherein the first virtual machine broadcasts a fourth ARP request for querying the MAC address of the third virtual machine, wherein a destination IP address field of the fourth ARP request records the private IP address of the third virtual machine, wherein the virtual bridge intercepts the fourth ARP request, and adds the VDCID of the first virtual machine to an identification field of the fourth ARP request according to the virtual machine entry table corresponding to the first physical machine, and redirects the fourth ARP request to the ARP server, wherein the ARP server queries the VDCID of the third virtual machine in the address query table according to the private IP address of the third virtual machine, and determines whether a value recorded in the identification field of the fourth ARP request is the same as the VDCID of the third virtual machine, wherein when the value recorded in the identification field of the fourth ARP request is the same as the VDCID of the third virtual machine, the ARP server transmits the MAC address of the third virtual machine to the virtual bridge according to the address query table, and the virtual bridge transmits the MAC address of the third virtual machine to the first virtual machine to respond the fourth ARP request.

10. The data center network system as claimed in claim 8, further comprising:

a third service node and a fourth service node, each of the service nodes connected to the network, wherein each of the service nodes has a service IP address, a VDCID and a MAC address, and the VDCID of each of the service nodes is set to a same predetermined value, wherein the third service node is executed on the first physical machine and is connected to the network through the virtual bridge, wherein the ARP server maintains an address query table, the address query table stores a plurality of mappings, and the mappings of the address query table record the service IP address, the VDCID and the MAC address of each of the service nodes, wherein the third service node broadcasts a fourth ARP request for querying the MAC address of the fourth service node, wherein a destination IP address field of the fourth ARP request records the service IP address of the fourth service node, wherein the virtual bridge intercepts the fourth ARP request, and adds the predetermined value to an identification field of the fourth ARP request according to the service IP address of the fourth service node, and redirects the fourth ARP request to the ARP server, wherein the ARP server queries the MAC address of the fourth service node in the address query table according to the identification field and the destination IP address field of the fourth ARP request, and transmits the MAC address of the fourth service node to the virtual bridge, wherein the virtual bridge transmits the MAC address of the fourth service node to the third service node in response to the fourth ARP request.

11. The data center network system as claimed in claim 8, wherein when the second service node receives a data packet from the first virtual machine, the second service node records the private IP address and the MAC address of the first virtual machine in a connection mapping table according to a source IP address, a source port, a destination IP address, a destination port and a MAC address of the data packet, wherein the second service node queries the private IP address and the MAC address of the first virtual machine according to the connection mapping table, and transmits a response data packet to the first virtual machine according to the private IP address and the MAC address of the first virtual machine.

12. The data center network system as claimed in claim 8, further comprising:

a server load balance (SLB) node, connected to the network, and having a load balance mapping table, wherein the load balance mapping table stores a plurality of mappings, and the mappings of the load balance mapping table record the private IP address and the VDCID of each of the plurality of virtual machines, wherein the SLB node receives a data packet to be transmitted to the first virtual machine in the plurality of virtual machines from an external link, and the SLB node queries the private IP address and the VDCID of the first virtual machine according to the load balance mapping table, wherein the SLB node broadcasts a sixth ARP request for querying the MAC address of the first virtual machine, wherein a destination IP address field of the sixth ARP request records the private IP address of the first virtual machine, and an identification field of the sixth ARP request records the VDCID of the first virtual machine, wherein the ARP server queries the MAC address of the first virtual machine in the address query table according to the identification field and the destination IP address field of the sixth ARP request, and transmits the MAC address of the first virtual machine to the SLB node.

13. A virtual bridge, executed on a first physical machine, and connected to a network, comprising:

a receiving module, intercepting a first address resolution protocol (ARP) request, wherein a first virtual machine executed on the first physical machine broadcasts the first ARP request for querying a MAC address of a second virtual machine executed on the first physical machine;

an identification module, coupled to the receiving module, and configured for determining whether a virtual data center identification (VDCID) of the first virtual machine is the same as a VDCID of the second virtual machine;

a transmitting module, coupled to the identification module; and a redirecting module coupled to the transmitting module, wherein when the identification module determines the VDCID of the first virtual machine is the same as the VDCID of the second virtual machine, the transmitting module forwards a MAC address of the second virtual machine to the first virtual machine in response to the first ARP request, wherein the receiving module intercepts a second ARP request, wherein the first virtual machine broadcasts the second ARP request for querying a MAC address of a first service node, wherein the redirecting module adds a predetermined value to an identification field of the second ARP request, and redirects the second ARP request to an ARP server.

14. The virtual bridge as claimed in claim 13, further comprising an entry table maintaining module configured for maintaining a virtual machine entry table of the first physical machine, wherein the virtual machine entry table includes a plurality of entries, wherein a plurality of virtual machines executed on the first physical machine and the entry table maintaining module records a private Internet protocol (IP) address, a virtual data center identification (VDCID) and a media access control (MAC) address of each of the plurality of virtual machines in the entries.

15. The virtual bridge as claimed in claim 13, further comprising a redirecting module coupled to the transmitting module, wherein the receiving module intercepts a third ARP request, wherein the first virtual machine broadcasts the third ARP request for querying a MAC address of a third virtual machine executed on a second physical machine, further comprising:

the redirecting module adds the VDCID of the first virtual machine to an identification field of the third ARP request and redirecting the third ARP request to an ARP server.

16. The virtual bridge as claimed in claim 13, further comprising a redirecting module coupled to the transmitting module, wherein the receiving module intercepts a fourth ARP request, wherein a second service node executed on the first physical machine broadcasts the fourth ARP request for querying a MAC address of a third service node, wherein the redirecting module adds a predetermined value to an identification field of the fourth ARP request, and redirects the fourth ARP request to an ARP server.

17. An address resolution protocol (ARP) server, comprising:

a receiving module, receiving an ARP request having a destination IP address field and an identification field;

an address query table maintaining module, coupled to the receiving module, maintaining an address query table and querying a corresponding MAC address in the address query table according to a IP address recorded in the destination IP address field of the ARP request and a VDCID recorded in the identification field of the ARP request; and a transmitting module, coupled to the address query table maintaining module and the receiving module, and transmitting the corresponding MAC address in response to the ARP request, wherein when the receiving module receives a redirected ARP request from a virtual bridge, the address query table maintaining module queries the VDCID of a target virtual machine in the address query table, and determines whether a value recorded in the identification field of the ARP request is the same as the VDCID of the target virtual machine, wherein when the value recorded in the identification field of the ARP request is the same as the VDCID of the target virtual machine, the transmitting module transmits the MAC address of the target virtual machine to the virtual bridge according to the address query table, wherein the address query table maintaining module stores a plurality of mappings in the address query table, and records a private IP address, a VDCID and a MAC address of each of a plurality of virtual machines in the mappings, wherein when the ARP server receives a first ARP request, which comprises for querying the MAC address of a first virtual machine in a plurality of virtual machines from a first service node, the ARP server queries the MAC address of the first virtual machine in the address query table according to the identification field and the destination IP address field of the first ARP request, and transmits the MAC address of the first virtual machine to the first service node to respond the first ARP request.

18. A packet forwarding method for a data center network system, wherein the data center network system comprises a first physical machine and a plurality of virtual machines and a virtual bridge executed on the first physical machine, a first virtual machine and a second virtual machine in the plurality of virtual machines are executed on the first physical machine and are connected to a network through the virtual bridge, and each of the plurality of virtual machines has a private Internet protocol (IP) address, a virtual data center identification (VDCID) and a media access control (MAC) address, wherein the plurality of virtual machines is respectively belonged to a plurality of virtual data centers (VDCs), and the plurality of virtual machines belonged to the same VDC has the same VDCID, wherein the virtual bridge has a virtual machine entry table corresponding to the first physical machine, and the virtual machine entry table stores a plurality of entries, the packet forwarding method comprising:

recording the private IP address, the VDCID and the MAC address of the first virtual machine to a first entry in the entries, and recording the private IP address, the VDCID and the MAC address of the second virtual machine to a second entry in the entries;

broadcasting a first address resolution protocol (ARP) request by using the first virtual machine for querying the MAC address of the second virtual machine, wherein a destination IP address field of the first ARP request records the private IP address of the second virtual machine;

intercepting the first ARP request by using the virtual bridge, and determining whether the VDCID of the first virtual machine is the same as the VDCID of the second virtual machine according to the virtual machine entry table corresponding to the first physical machine; and when the VDCID of the first virtual machine is the same as the VDCID of the second virtual machine, forwarding the MAC address of the second virtual machine to the first virtual machine according to the virtual machine entry table corresponding to the first physical machine by using the virtual bridge in response to the first ARP request, wherein the data center network system further comprises a first service node connected to the network and having a wrapper module, and the packet forwarding method further comprises:

broadcasting a second ARP request by using the first service node for querying the MAC address of a third virtual machine of the plurality of virtual machines, wherein a destination IP address field of the second ARP request records the private IP address of the third virtual machine, and the wrapper module adds the VDCID of the third virtual machine to an identification field of the second ARP request; and querying the MAC address of the third virtual machine in an address query table according to the identification field and the destination IP address field of the second ARP request by using the ARP server, and transmitting the MAC address of the third virtual machine to the first service node to respond the second ARP request, wherein the data center network system further comprises a second service node connected to the network, and the packet forwarding method further comprises:

recording a service IP address, a VDCID and a MAC address of the second service node to the mappings of the address query table, and setting the VDCID of the second service node to a predetermined value;

broadcasting a third ARP request by using the first virtual machine for querying the MAC address of the second service node, where a destination IP address field of the third ARP request records the service IP address of the second service node;

intercepting the third ARP request by using the virtual bridge, adding the predetermined value to an identification field of the third ARP request according to the service IP address of the second service node, and redirecting the third ARP request to the ARP server, querying the MAC address of the second service node in the address query table according to the identification field and the destination IP address field of the third ARP request by using the ARP server, and transmitting the MAC address of the second service node to the virtual bridge; and transmitting the MAC address of the second service node to the first virtual machine by using the virtual bridge in response to the third ARP request.

19. The packet forwarding method of the data center network system as claimed in claim 18, wherein the data center network system further comprises an ARP server connected to the network and a second physical machine, wherein the ARP server maintains the address query table, the address query table stores a plurality of mappings, and the mappings of the address query table record the private IP address, the VDCID and the MAC address of each of the plurality of virtual machines, wherein the third virtual machine in the plurality of virtual machines is executed on the second physical machine, and the packet forwarding method further comprises:

broadcasting a fourth ARP request by using the first virtual machine for querying the MAC address of the third virtual machine, wherein a destination IP address field of the fourth ARP request records the private IP address of the third virtual machine;

intercepting the fourth ARP request by using the virtual bridge, adding the VDCID of the first virtual machine to an identification field of the fourth ARP request according to the virtual machine entry table corresponding to the first physical machine, and redirecting the fourth ARP request to the ARP server;

querying the VDCID of the third virtual machine in the address query table according to the private IP address of the third virtual machine by using the ARP server, and determining whether a value recorded in the identification field of the fourth ARP request is the same as the VDCID of the third virtual machine; and when the value recorded in the identification field of the fourth ARP request is the same as the VDCID of the third virtual machine, the ARP server transmitting the MAC address of the third virtual machine to the virtual bridge according to the address query table, and the virtual bridge transmitting the MAC address of the third virtual machine to the first virtual machine to respond the fourth ARP request.

20. The packet forwarding method of the data center network system as claimed in claim 19, wherein the data center network system further comprises a third service node and a fourth service node, each of the service nodes connected to the network, wherein each of the service nodes has a service IP address, a VDCID and a MAC address respectively recorded in the mappings of the address query table of the ARP server, wherein the VDCID of each of the service nodes is set to a same predetermined value, wherein the third service node is executed on the first physical machine and is connected to the network through the virtual bridge, and the packet forwarding method further comprises:

broadcasting a fifth ARP request by using the third service node for querying the MAC address of the fourth service node, wherein a destination IP address field of the fifth ARP request records the service IP address of the fourth service node;

intercepting the fifth ARP request by using the virtual bridge, adding the predetermined value to an identification field of the fifth ARP request according to the service IP address of the fourth service node, and redirecting the fifth ARP request to the ARP server;

querying the MAC address of the fourth service node in the address query table according to the identification field and the destination IP address field of the fifth ARP request by using the ARP server, and transmitting the MAC address of the fourth service node to the virtual bridge; and transmitting the MAC address of the fourth service node to the third service node by using the virtual bridge in response to the fifth ARP request.

21. The packet forwarding method of the data center network system as claimed in claim 18, further comprising:

when the second service node receives a data packet from the first virtual machine, recording the private IP address and the MAC address of the first virtual machine in a connection mapping table according to a source IP address, a source port, a destination IP address, a destination port and a MAC address of the data packet by using the second service node; and querying the private IP address and the MAC address of the first virtual machine according to the connection mapping table by using the second service node, and transmitting a response data packet to the first virtual machine according to the private IP address and the MAC address of the first virtual machine.

22. The packet forwarding method of the data center network system as claimed in claim 19, wherein the data center network system further comprises a server load balance (SLB) node connected to the network, wherein the SLB node has a load balance mapping table, the load balance mapping table stores a plurality of mappings, and the mappings of the load balance mapping table record the private IP address and the VDCID of each of the plurality of virtual machines, and the packet forwarding method comprises:

receiving a data packet to be transmitted to the first virtual machine from an external link by using the SLB node, and querying the private IP address and the VDCID of the first virtual machine according to the load balance mapping table by using the SLB node;

broadcasting a sixth ARP request by using the SLB node for querying the MAC address of the first virtual machine, wherein a destination IP address field of the sixth ARP request records the private IP address of the first virtual machine, and an identification field of the sixth ARP request records the VDCID of the first virtual machine; and querying the MAC address of the first virtual machine in the address query table according to the identification field and the destination IP address field of the sixth ARP request by using the ARP server, and transmitting the MAC address of the first virtual machine to the SLB node.

* * * * *